(12) United States Patent
Chen et al.

(10) Patent No.: US 10,999,736 B2
(45) Date of Patent: May 4, 2021

(54) COMMUNICATION METHOD AND RELATED DEVICE

(71) Applicant: HUAWEI TECHNOLOGIES CO., LTD., Guangdong (CN)

(72) Inventors: Jing Chen, Shanghai (CN); Kai Pan, Shanghai (CN); He Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/795,087

(22) Filed: Feb. 19, 2020

(65) Prior Publication Data

US 2020/0196146 A1 Jun. 18, 2020

Related U.S. Application Data

(63) Continuation of application No. PCT/CN2018/094845, filed on Jul. 6, 2018.

(30) Foreign Application Priority Data

Aug. 21, 2017 (CN) .......................... 201710723994.3

(51) Int. Cl.
*H04M 1/66* (2006.01)
*H04W 12/06* (2021.01)
(Continued)

(52) U.S. Cl.
CPC ............ *H04W 12/06* (2013.01); *H04L 9/3242* (2013.01); *H04W 8/08* (2013.01); *H04W 76/10* (2018.02)

(58) Field of Classification Search
USPC ................................................ 455/411, 410
See application file for complete search history.

(56) References Cited

U.S. PATENT DOCUMENTS

2012/0275401 A1 11/2012 Sun
2017/0171752 A1 6/2017 Lee et al.
(Continued)

FOREIGN PATENT DOCUMENTS

CN 1941990 A 4/2007
CN 101867986 A 10/2010
(Continued)

OTHER PUBLICATIONS

China Mobile,"23.502: Correction and Update PDU Session Establishment Procedure",SA WG2 Meeting #S2-120, S2-171822, Mar. 27-31, 2017, Busan, Korea, total 14 pages.
(Continued)

*Primary Examiner* — David Q Nguyen
(74) *Attorney, Agent, or Firm* — Womble Bond Dickinson (US) LLP

(57) ABSTRACT

A communication method and related device are disclosed. In at least one embodiment, a reference message authentication code is obtained by a terminal device based on a first message authentication code and a second message authentication code. The first message authentication code is used by an AMF to check a service request message, and the second message authentication code is used by an SMF to check the service request message. and sending, by the terminal device, first information and the service request message are sent by the terminal device to the AMF. The first information is used to instruct the AMF to send the service request message to the SMF. The service request message includes second information. The second information includes the reference message authentication code. The SMF can perform a security check on the service request message to ensure security of a communications network.

20 Claims, 11 Drawing Sheets

Communications system 100

(51) Int. Cl.
  *H04W 76/10*  (2018.01)
  *H04L 9/32*  (2006.01)
  *H04W 8/08*  (2009.01)

(56) References Cited

U.S. PATENT DOCUMENTS

2018/0227302 A1* 8/2018 Lee ................ H04L 9/0861
2018/0376444 A1* 12/2018 Kim ................ H04W 4/70
2019/0044880 A1* 2/2019 Yi ................ H04L 47/624
2019/0053098 A1* 2/2019 Jo ................ H04W 76/19

FOREIGN PATENT DOCUMENTS

| CN | 107018542 A | 8/2017 |
| EP | 1811736 A1 | 7/2007 |
| WO | 2017024579 A1 | 2/2017 |

OTHER PUBLICATIONS

3GPP TR 33.899 V1.0.0 (Mar. 2017),3rd Generation Partnership Project;Technical Specification Group Services and System Aspects;Study on the security aspects of the next generationsystem(Release 14), total 472 pages.
3GPP TS 23.502 V0.6.0 (Aug. 2017),3rd Generation Partnership Project;Technical Specification Group Services and System Aspects;Procedures for the 5G System;Stage 2(Release 15), total 148 pages.
Qualcomm Incorporated, EAP based secondary authentication with PDU session authorization information. 3GPP TSG SA WG3 (Security) Meeting #87, 15 May 19, 2017, Ljubljana, Slovenia, S3-171329, 6 pages.

* cited by examiner

Service request message

| Protocol discriminator | Security header type | KSI | SN | MAC |
|---|---|---|---|---|

COMMUNICATION METHOD AND RELATED DEVICE

CROSS-REFERENCE TO RELATED APPLICATIONS

This application is a continuation of International Application No. PCT/CN2018/094845, filed on Jul. 6, 2018, which claims priority to Chinese Patent Application No. 201710723994.3, filed on Aug. 21, 2017. The disclosures of the aforementioned applications are hereby incorporated by reference in their entireties.

TECHNICAL FIELD

This application relates to the wireless communications field, and in particular, to a communication method and a related device.

BACKGROUND

In a fifth-generation (5G) mobile communications standard, an access and mobility management function (AMF) and a session management function (SMF) are introduced. The AMF may be configured to implement an access management function and a mobility management function of a mobility management entity (MME) in a long term evolution (LTE) system. The SMF may be configured to implement a session management function of the MME.

In the LTE system, a terminal device sends a service request (SR) message to the MME by using a non-access stratum (NAS), and the MME checks security of the service request message based on information carried in the service request message, so that the MME implements session management on the terminal device. In a 5G system, a terminal device sends a service request message to the SMF by using the AMF, so that the SMF implements session management on the terminal device based on the service request message. However, because a security risk is exposed to an interface between the AMF and the SMF has, an SR may be tampered with.

SUMMARY

This application provides a communication method and a related device, so that an SMF can check a service request message, and security of a communications network is ensured.

At least one embodiment of the application provides a communication method, and the method includes:

obtaining, by a terminal device, a reference message authentication code based on a first message authentication code and a second message authentication code, where the first message authentication code is used by an access and mobility management function AMF to check a service request message, and the second message authentication code is used by a session management function SMF to check the service request message; and sending, by the terminal device, first information and the service request message to the AMF, where the first information is used to instruct the AMF to send the service request message to the SMF, the service request message includes second information, and the second information includes the reference message authentication code.

In at least one embodiment, the method further includes:

obtaining, by the terminal device, the first message authentication code based on a first algorithm and a first input parameter, where the first input parameter includes at least one of the following parameters: a first key, at least one information element in the service request message other than the reference message authentication code, and a first count value; or obtaining, by the terminal device, the second message authentication code based on a second algorithm and a second input parameter, where the second input parameter includes at least one of the following parameters: a second key, at least one information element in the service request message other than the reference message authentication code, and a second count value.

In at least one embodiment, when the first input parameter includes the first count value, the second information further includes a first field in the first count value; or when the second input parameter includes the second count value, the second information further includes a second field in the second count value; or when the first input parameter includes the first count value, and the second input parameter includes the second count value, the second information further includes a third field, and the third field is obtained based on a first field in the first count value and a second field in the second count value; or when the first input parameter includes the first count value, the second input parameter includes the second count value, and the first count value is the same as the second count value, the second information further includes a first field in the first count value or a second field in the second count value; or when the first input parameter includes the first count value, the second input parameter includes the second count value, and there is a mapping relationship between the first count value and the second count value, the second information further includes a first field in the first count value or a second field in the second count value.

In at least one embodiment, when the first input parameter includes the first key, the second information further includes a first key set identifier, and the first key set identifier is used to indicate a first root key; or when the second input parameter includes the second key, the second information further includes a second key set identifier, and the second key set identifier is used to indicate a second root key.

In at least one embodiment, the first input parameter further includes some or all code segments of the second message authentication code; or the second input parameter further includes some or all code segments of the first message authentication code.

In at least one embodiment, the obtaining, by a terminal device, a reference message authentication code based on a first message authentication code and a second message authentication code includes:

obtaining, by the terminal device, a third message authentication code based on the first message authentication code, the second message authentication code, and a hash algorithm, and obtaining the reference message authentication code based on the third message authentication code; or obtaining, by the terminal device, the reference message authentication code based on the first message authentication code, the second message authentication code, and a hash algorithm.

In at least one embodiment, the obtaining the reference message authentication code based on the third message authentication code includes:

when a length of the third message authentication code is greater than a first preset length, the reference message authentication code is some code segments of the third message authentication code, and a length of the some code segments is less than or equal to the first preset length; or when a length of the third message authentication code is greater than a first preset length, obtaining the reference message authentication code based on at least two code segments of the third message authentication code.

In at least one embodiment, the obtaining, by a terminal device, a reference message authentication code based on a first message authentication code and a second message authentication code includes:

obtaining, by the terminal device, a first code segment based on the first message authentication code;

obtaining, by the terminal device, a second code segment based on the second message authentication code; and splicing, by the terminal device, the first code segment and the second code segment, to obtain the reference message authentication code.

In at least one embodiment, the first code segment is some code segments of the first message authentication code, or the first code segment is obtained based on at least two code segments of the first message authentication code; and In at least one embodiment, the second code segment is some code segments of the second message authentication code, or the second code segment is obtained based on at least two code segments of the second message authentication code.

In at least one embodiment of the application provides a communication method, and the method includes:

receiving, by an access and mobility management function AMF, first information and a service request message that are sent by a terminal device, where the first information is used to instruct the AMF to send the service request message to a session management function SMF, the service request message includes second information, and the second information includes a reference message authentication code;

sending, by the AMF, the service request message to the SMF based on the first information; and checking, by the AMF, the service request message based on the second information.

In at least one embodiment, the checking, by the AMF, the service request message based on the second information includes:

obtaining, by the AMF, a first message authentication code based on a first algorithm;

receiving, by the AMF, a second message authentication code from the SMF;

obtaining, by the AMF, a third message authentication code based on the first message authentication code and the second message authentication code; and checking, by the AMF, the service request message based on the third message authentication code and the reference message authentication code.

In at least one embodiment, the checking, by the AMF, the service request message based on the second information includes:

obtaining, by the AMF, a first message authentication code based on a first algorithm;

obtaining, by the AMF, a first code segment based on the first message authentication code;

obtaining, by the AMF, a reference code segment based on the reference message authentication code; and checking, by the AMF, the service request message based on the first code segment and the reference code segment.

In at least one embodiment, the method further includes:

sending, by the AMF, the first message authentication code to the SMF, where the first message authentication code is used by the SMF to obtain the second message authentication code.

In at least one embodiment, the checking, by the AMF, the service request message based on the second information includes:

receiving, by the AMF, a second message authentication code from the SMF;

obtaining, by the AMF, a first message authentication code based on a first algorithm and the second message authentication code; and checking, by the AMF, the service request message based on the first message authentication code and the reference message authentication code.

In at least one embodiment, the checking, by the AMF, the service request message based on the first message authentication code and the reference message authentication code includes:

obtaining, by the AMF, a third message authentication code based on the first message authentication code and the second message authentication code, and checking the service request message based on the third message authentication code and the reference message authentication code; or obtaining, by the AMF, a first code segment based on the first message authentication code, obtaining a reference code segment based on the reference message authentication code, and checking the service request message based on the first code segment and the reference code segment.

At least one embodiment of the application provides a communication method, and the method includes:

receiving, by a session management function SMF, a service request message from an access and mobility management function AMF, where the service request message includes second information, and the second information includes a reference message authentication code; and checking, by the SMF, the service request message based on the second information.

In at least one embodiment, the checking, by the SMF, the service request message based on the second information includes:

receiving, by the SMF, a first message authentication code from the AMF;

obtaining, by the SMF, a second message authentication code based on a second algorithm;

obtaining, by the SMF, a third message authentication code based on the first message authentication code and the second message authentication code; and checking, by the SMF, the service request message based on the third message authentication code and the reference message authentication code.

In at least one embodiment, the checking, by the SMF, the service request message based on the second information includes:

obtaining, by the SMF, a second message authentication code based on a second algorithm;

obtaining, by the SMF, a second code segment based on the second message authentication code;

obtaining, by the SMF, a reference code segment based on the reference message authentication code; and checking, by the SMF, the service request message based on the second code segment and the reference code segment.

In at least one embodiment, the SMF sends the second message authentication code to the AMF, where the second message authentication code is used by the AMF to obtain the first message authentication code.

In at least one embodiment, the checking, by the SMF, the service request message based on the second information includes:

receiving, by the SMF, a first message authentication code from the AMF;

obtaining, by the SMF, a second message authentication code based on a second algorithm and the first message authentication code; and checking, by the SMF, the service request message based on the second message authentication code and the reference message authentication code.

In at least one embodiment, the checking, by the SMF, the service request message based on the second message authentication code and the reference message authentication code includes:

obtaining, by the SMF, a third message authentication code based on the first message authentication code and the second message authentication code, and checking the service request message based on the third message authentication code and the reference message authentication code; or obtaining, by the SMF, a second code segment based on the second message authentication code, obtaining a reference code segment based on the reference message authentication code, and checking the service request message based on the second code segment and the reference code segment.

At least one embodiment of the application provides a terminal device. The terminal device is configured to implement the foregoing method. The terminal device may implement the foregoing method by using hardware, or may implement the foregoing method by executing corresponding software by hardware. The hardware or software includes one or more functional units. In at least one embodiment, the terminal device may include an input unit, a processing unit, and an output unit. The foregoing functional units included in a data processing device can implement some or all operations of any method disclosed herein.

At least one embodiment of the application provides an access and mobility management function AMF. The AMF is configured to implement the foregoing method. The AMF may implement the foregoing method by using hardware, or may implement the foregoing method by executing corresponding software by hardware. The hardware or software includes one or more functional units. In at least one embodiment, the AMF may include an input unit, a processing unit, and an output unit. The foregoing functional units included in a data processing device can implement some or all operations of any method disclosed herein.

At least one embodiment of the application provides a session management function SMF. The SMF is configured to implement the foregoing method. The SMF may implement the foregoing method by using hardware, or may implement the foregoing method by executing corresponding software by hardware. The hardware or software includes one or more functional units. In at least one embodiment, the SMF may include an input unit, a processing unit, and an output unit. The foregoing functional units included in a data processing device can implement some or all operations of any method disclosed herein.

At least one embodiment of the application provides a terminal device. The terminal device includes a processor, a memory, and a computer program that is stored in the memory and that can be invoked and executed by the processor. The processor invokes the computer program to perform some or all operations of any method disclosed herein.

At least one embodiment of the application provides an access and mobility management function AMF. The AMF includes a processor, a memory, and a computer program that is stored in the memory and that can be invoked and executed by the processor. The processor invokes the computer program to perform some or all operations of any method disclosed herein.

At least one embodiment of the application provides a session management function SMF. The SMF includes a processor, a memory, and a computer program that is stored in the memory and that can be invoked and executed by the processor. The processor invokes the computer program to perform some or all operations of any method disclosed herein.

At least one embodiment of the application provides a readable nonvolatile storage medium storing a computer instruction. The computer instruction is executed by a data processing device to implement some or all operations of any method disclosed herein.

At least one embodiment of the application provides a readable nonvolatile storage medium storing a computer instruction. The computer instruction is executed by a data processing device to implement some or all operations of any method disclosed herein.

At least one embodiment of the application provides a readable nonvolatile storage medium storing a computer instruction. The computer instruction is executed by a data processing device to implement some or all operations of any method disclosed herein.

At least one embodiment of the application provides a computer program product. The computer program product is stored in a storage medium, and the computer program product includes an instruction used to perform some or all operations of any method disclosed herein.

At least one embodiment of the application provides a computer program product. The computer program product is stored in a storage medium, and the computer program product includes an instruction used to perform some or all operations of any method disclosed herein.

At least one embodiment of the application provides a computer program product. The computer program product is stored in a storage medium, and the computer program product includes an instruction used to perform some or all operations of any method disclosed herein.

In at least one embodiment, the terminal device obtains the reference message authentication code based on the first message authentication code and the second message authentication code. The terminal device may send a request message to the AMF, the request message includes the first information and the service request message, the service request message includes the second information, and the second information includes the reference message authentication code. The AMF may send the service request message to the SMF based on the first information, and the AMF may check the service request message based on the second information. The SMF may check the service request message based on the second information. Therefore, the SMF can perform a security check on the service request message, to ensure security of a communications network.

BRIEF DESCRIPTION OF DRAWINGS

To describe the technical solutions in the embodiments of the application more clearly, the following briefly describes the accompanying drawings required for describing the embodiments or the prior art.

FIG. 3 is a schematic composition diagram of information elements of a service request message according to an embodiment of the application;

DESCRIPTION OF EMBODIMENTS

Terms used in an implementation part of the application are only used to explain embodiments of the application, and are not intended to limit the application.

To help understand the technical solutions provided in the embodiments of the application, the following describes a system architecture in the embodiments of the application.

Figure 1:
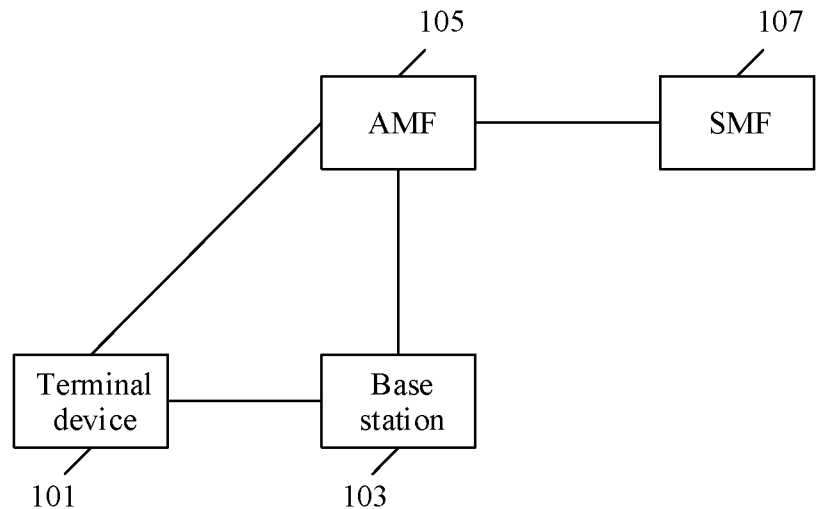
FIG. 1 is a schematic architectural diagram of a communications system according to an embodiment of the application.

FIG. 1 is a schematic architectural diagram of a communications system 100 according to an embodiment of the application. As shown in FIG. 1, the communications system 100 includes a terminal device 101, a base station 103, an AMF 105, and an SMF 107. The communications system 100 may be applied to a 5G scenario, or may be applied to an evolved system after 5G.

The terminal device 101 is a device that provides a user with voice and/or data connectivity. For example, the terminal device 101 may include a handheld device with a wireless connection function, or a processing device connected to a wireless modem. The terminal device 101 may communicate with a core network by using the base station 103, and the terminal device 101 may also exchange voice and/or data with a radio access network (RAN). The terminal device 101 may include an access point (AP), user equipment (UE), a wireless terminal, a mobile terminal, a subscriber unit, a subscriber station, a mobile station, a mobile console, a remote station, a remote terminal, an access terminal, a user terminal, a user agent, a user device, and the like. For example, the terminal device 101 may include a mobile phone (or referred to as a "cellular" phone), a computer with a mobile terminal, a portable, pocket-sized, handheld, computer built-in, or in-vehicle mobile apparatus, and an intelligent wearable device. For example, the terminal device 101 may be a device such as a personal communications service (PCS) phone, a cordless telephone set, a session initiation protocol (SIP) phone, a wireless local loop (WLL) station, a personal digital assistant (PDA), a smartwatch, a smart helmet, smart glasses, or a smart band.

The base station 103 may include an evolved NodeB (eNB or e-NodeB, evolutional NodeB) in an LTE system or an evolved LTE system (LTE-A), a small cell (e.g., micro/pico eNB) in the LTE system or the LTE-A system, a next-generation nodeB (gNB) in an NR system, a transmission point (TP), a transmission reception node (TRP), and the like. The base station 103 may receive, by using a NAS stratum, a message sent by the AMF 105, and forward the message to the terminal device 101. Alternatively, the base station 103 may forward, to the AMF 105 by using a NAS stratum, a message (for example, a service request message) sent by the terminal device 101.

The AMF 105 may be implemented by a device having an access and mobility management function, or may be implemented by an independent entity.

The SMF 107 may be implemented by a device having a session management function, or may be implemented by an independent entity.

Certainly, the communications system 100 may further include another network element such as a user plane function (UPF) or a data network (DN). Details are not described herein.

In the communications system 100, the terminal device 101 may send a service request message to the AMF 105, so that the AMF 105 implements mobility and access management on the terminal device 101 based on the service request message. Alternatively, the terminal device 101 may transmit a service request message to the SMF 107 by using the AMF 105, so that the SMF 107 implements session management on the terminal device 101 based on the service request message, for example, sets up a session, modifies a session, or releases a session for the terminal device.

For example, when the terminal device 101 sends the service request message to the AMF 105, the AMF 105 may perform a security check on the service request message based on information carried in the service request message. If the check succeeds, the AMF 105 may implement mobility and access management on the terminal device 101 based on the service request message. Because an interface between the AMF 105 and the SMF 107 is insecure, for example, the service request message may be tampered with when being transmitted through the interface, the SMF 107 checks the received service request message, to ensure security of a communications network.

The following describes the technical solutions provided in the embodiments of the application with reference to the foregoing network architecture of the communications system and the proposed issue.

Figure 2:
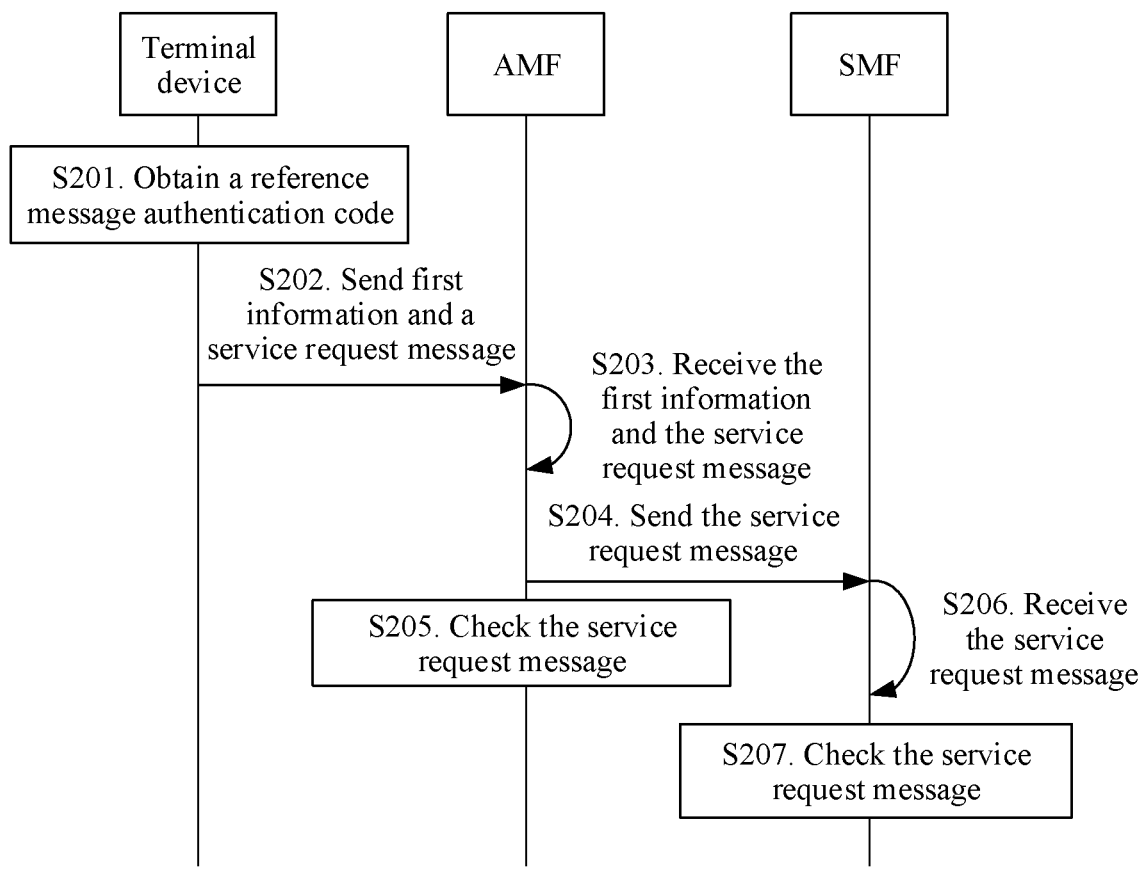
FIG. 2 is a schematic flowchart of a communication method according to an embodiment of the application.

FIG. 2 is a schematic flowchart of a communication method according to an embodiment of the application. As shown in FIG. 2, the method includes the following operations.

Operation S201: A terminal device obtains a reference message authentication code based on a first message authentication code and a second message authentication code.

The first message authentication code may be used by an AMF to check a service request message, and the second message authentication code may be used by an SMF to check the service request message.

In operation S201, the reference message authentication code may be obtained in any one of the following manners:

Manner 1: The terminal device obtains a third message authentication code based on the first message authentication code, the second message authentication code, and a hash algorithm, and obtains the reference message authentication code based on the third message authentication code.

For example, the terminal device may obtain the third message authentication code by calculating the first message authentication code and the second message authentication code based on the hash algorithm. A length of the third message authentication code is greater than a first preset length, and the first preset length may be determined based on a length of a MAC information element in the service request message. Then, the terminal device obtains the reference message authentication code based on the third message authentication code.

For example, the third message authentication code is truncated to obtain the reference message authentication code. The reference message authentication code includes some code segments of the third message authentication code that are obtained through truncation, and a length of the some code segments of the third message authentication code that are obtained through truncation is less than or equal to the first preset length. In addition, the terminal device, the AMF, and the SMF may truncate the third message authentication code in a same manner. A manner of truncating the third message authentication code may include: determining a truncation start point and a truncation end point, determining a truncation start point and a length of a code segment obtained through truncation, or the like. This is not limited in this embodiment of the application.

For another example, the reference message authentication code is obtained based on at least two code segments of the third message authentication code. Specifically, the reference message authentication code may be obtained by performing a calculation (for example, an exclusive OR calculation) on the at least two code segments of the third message authentication code. The at least two calculated code segments may have a same length or different lengths. If two code segments have different lengths, a preset code segment is added to a shorter code segment for calculation. A length of the preset code segment is a difference between a length of a longer code segment and a length of the shorter code segment. The terminal device, the AMF, and the SMF may obtain the at least two calculated code segments of the third message authentication code in a same manner. For example, a manner of obtaining the at least two code segments of the third message authentication code may include: truncating the third message authentication code based on at least two preset truncation start points and a truncation length corresponding to each truncation start point, to obtain the at least two code segments; or truncating the third message authentication code based on at least two preset truncation start points and a preset length, where a length between every two truncation start points is greater than or equal to the preset length; or truncating the third message authentication code based on at least two preset truncation start points and a truncation end point corresponding to each truncation start point. A manner of obtaining the at least two code segments is not limited in this embodiment of the application.

A length of the reference message authentication code obtained in Manner 1 is less than or equal to the first preset length, so that the reference message authentication code can be carried in the MAC information element in the service request message.

Manner 2: The terminal device obtains the reference message authentication code based on the first message authentication code, the second message authentication code, and the hash algorithm.

For example, after calculating the first message authentication code and the second message authentication code based on the hash algorithm, the terminal device may obtain a message authentication code whose length is less than or equal to the first preset length. The message authentication code may be directly used as the reference message authentication code, and may be carried in a MAC information element in the service request message.

Manner 3: The terminal device obtains a first code segment based on the first message authentication code, obtains a second code segment based on the second message authentication code, and splices the first code segment and the second code segment, to obtain the reference message authentication code.

For example, the first code segment may be some code segments of the first message authentication code. For example, the first code segment may be obtained by truncating the first message authentication code. Specifically, some low-order bits of the first message authentication code may be obtained through truncation, or some high-order bits of the first message authentication code may be obtained through truncation. Alternatively, the first code segment may be obtained by calculating at least two code segments of the first message authentication code. For a manner of obtaining the first code segment, refer to the foregoing manner of obtaining the reference message authentication code based on the at least two code segments. Details are not described herein again. The terminal device and the AMF may obtain the first code segment in a same manner. Likewise, the second code segment may be some code segments of the second message authentication code, or the second code segment is obtained by calculating at least two code segments of the second message authentication code. The terminal device and the SMF may obtain the second code segment in a same manner.

Certainly, a manner of obtaining the reference message authentication code may be a combination of the foregoing manners. For example, the first code segment is obtained based on the first message authentication code, the second code segment is obtained based on the first message authentication code and the second message authentication code, and the first code segment and the second code segment are spliced to obtain the reference message authentication code. Examples are not listed one by one herein.

Operation S202: The terminal device sends first information and the service request message to the AMF.

The first information may be used to instruct the AMF to send the service request message to the SMF. The service request message may be used to request the SMF to perform session management on the terminal device. In addition, the first information and the service request message may be carried in a same message such as a first request message and then sent to the AMF. This is not limited.

The service request message may include second information, and the second information may be used by the AMF and the SMF to perform an integrity check on the service request message. For example, the second information may include the reference message authentication code, and the reference message authentication code may be carried in the MAC information element in the service request message. Correspondingly, after receiving the service request message, the AMF and the SMF may perform an integrity check on the service request message based on the reference message authentication code.

It should be noted that the first information may be used to explicitly or implicitly instruct the AMF to send the service request message to the SMF. Details are as follows:

In an implicit implementation, the first information is a session-related identifier. When a message that is received by the AMF from the terminal device and that carries the service request message further carries the session-related identifier, the AMF sends the service request message to the SMF. Alternatively, when a message that is received by the AMF from the terminal device and that carries the service request message does not carry the session-related identifier, the AMF does not need to send the service request message to the SMF. The session-related identifier may be a protocol data unit session identifier (PDU Session ID).

The PDU Session ID may be used to identify a PDU session. When receiving the PDU Session ID, the SMF may configure a session for the terminal device based on the PDU Session ID, so that the terminal device can receive downlink data from a network by using the session, or the terminal device can send uplink data by using the session.

In an explicit implementation, the first information may be directly used to instruct the AMF to send the service request message to the SMF. Assuming that the first information is used to instruct the AMF to send the service request message to the SMF, the service request message may be jointly checked by the SMF and the AMF.

An instruction form of the first information is not limited herein.

For example, the terminal device may send the first information and the service request message to the AMF by using a base station. The base station may send the first information and the service request message through an interface between the base station and the AMF. For example, the base station sends, to the AMF by using an N2 message, the first request message that carries the first information and the service request message. A message transmission form is not limited in this embodiment of the application.

Operation S203: The AMF receives the first information and the service request message.

Operation S204: The AMF sends the service request message to the SMF based on the first information.

For example, the AMF receives the first request message sent by the terminal device. When the first request message carries the first information and the service request message, the AMF may send the service request message to the SMF through an interface between the AMF and the SMF. For example, the AMF sends, to the SMF, an N11 message that carries the service request message.

For an implementation of the first information, refer to the corresponding description in operation S202. Details are not described herein again.

Operation S205: The AMF checks the service request message based on the second information in the service request message.

In an implementation, the AMF may obtain a to-be-compared message authentication code, and the AMF compares the reference message authentication code in the second information with the to-be-compared message authentication code, to check the service request message. Specifically, the AMF may determine, through comparison, whether the reference message authentication code is consistent with the to-be-compared message authentication code. If the reference message authentication code is consistent with the to-be-compared message authentication code, it may indicate that the check performed by the AMF on the service request message succeeds. If the reference message authentication code is inconsistent with the to-be-compared message authentication code, it may indicate that the check performed by the AMF on the service request message fails. Alternatively, the AMF may determine a bit error rate of the to-be-compared message authentication code relative to the reference message authentication code. If the bit error rate is less than a preset threshold, it may indicate that the check performed by the AMF on the service request message succeeds. If the bit error rate is greater than or equal to a preset threshold, it may indicate that the check performed by the AMF on the service request message fails. Certainly, the AMF may alternatively check the service request message in another manner. This is not limited herein.

For example, the AMF may correspondingly obtain the to-be-compared message authentication code in a manner in which the terminal device obtains the reference message authentication code. For an implementation, refer to the following embodiment.

Operation S206: The SMF receives the service request message sent by the AMF.

For example, the SMF receives the N11 message sent by the AMF, and the N11 message carries the service request message.

Operation S207: The SMF checks the service request message based on the second information.

In an implementation, the SMF may obtain a to-be-compared message authentication code, and the SMF compares the reference message authentication code in the second information with the to-be-compared message authentication code, to check the service request message. Herein, the to-be-compared message authentication code obtained by the SMF may be the same as or different from the to-be-compared message authentication code obtained by the AMF. The SMF may compare the reference message authentication code with the to-be-compared message authentication code in the foregoing comparison manner used by the AMF. Certainly, the SMF may alternatively perform a check in another manner. This is not limited herein.

For example, the SMF may correspondingly obtain the to-be-compared message authentication code in the manner in which the terminal device obtains the reference message authentication code. For an implementation, refer to the following embodiment.

In an embodiment of the application, the terminal device obtains the reference message authentication code based on the first message authentication code and the second message authentication code. The terminal device may send a request message to the AMF, the request message includes the first information and the service request message, the service request message includes the second information, and a second message includes the reference message authentication code. The AMF may send the service request message to the SMF based on the first information, and the AMF may check the service request message based on the second information. The SMF may check the service request message based on the second information. Therefore, the SMF can perform a security check on the service request message, to ensure security of a communications network.

Optionally, before operation 201, the method further includes: obtaining, by the terminal device, the first message authentication code based on a first algorithm and a first input parameter.

The first algorithm may be preset in the terminal device, or may be configured by the AMF. For example, after authentication on the terminal device succeeds, the AMF may send the first algorithm to the terminal device by using a security mode command (SMC) at the NAS stratum.

The first input parameter may include at least one of the following parameters: a first key, one or more information elements in the service request message other than the reference message authentication code, and a first count (Count) value.

For example, the first key may be an integrity protection key, and is used to protect integrity of the service request message to be sent by the terminal device. The AMF and the terminal device each may store the first key.

For example, FIG. 3 is a schematic composition diagram of information elements of a service request message. The service request message includes a protocol discriminator, a security header type, a key set identifier (KSI), a sequence number (SN), and a message authentication code (MAC). In an embodiment of the application, the first input parameter may include one or more information elements of the protocol discriminator, the security header type, the key set identifier, and the sequence number. In other words, the first input parameter includes at least one information element other than the MAC.

For example, the first count value may be a variable parameter. The first count value may be preset, or may be configured by the AMF, or may be separately generated by the AMF and the terminal device according to a same rule.

The first input parameter may include one or more of the foregoing parameters. This is not limited herein in this embodiment of the application.

Optionally, before operation S201, the method further includes: obtaining, by the terminal device, the second message authentication code based on a second algorithm and a second input parameter.

The second algorithm may be preset in the terminal device, or may be configured by the SMF.

The second input parameter may include at least one of the following parameters: a second key, at least one information element in the service request message other than the reference message authentication code, and a second count value.

For example, the second key may be an integrity protection key. The SMF and the terminal device may separately store the second key.

For example, if the service request message includes the information elements shown in FIG. 3, the second input parameter may include one or more information elements of the protocol discriminator, the security header type, the key set identifier, and the sequence number. In other words, the second input parameter includes at least one information element other than the MAC information element. The information element included in the second input parameter may be the same as or different from the information element included in the first input parameter. For example, the first input parameter may include the protocol discriminator information element, the security header type information element, the key set identifier information element, and the sequence number information element, and the second input parameter may include the protocol discriminator information element, the security header type information element, the key set identifier information element, and the sequence number information element. In this case, the information elements included in the first input parameter are the same as the information elements included in the second input parameter. For example, the first input parameter may include the protocol discriminator information element and the security header type information element, and the second input parameter may include the key set identifier information element and the sequence number information element. In this case, the information elements included in the first input parameter are different from the information elements included in the second input parameter.

For example, the second count value may be a variable parameter. The second count value may be preset, or may be configured by the SMF, or may be separately generated by the SMF and the terminal device according to a same rule.

The second input parameter may include one or more of the foregoing parameters. This is not limited herein in this embodiment of the application.

Optionally, the first input parameter further includes some or all code segments of the second message authentication code; or the second input parameter further includes some or all code segments of the first message authentication code. To be specific, if the first input parameter includes the some or all code segments of the second message authentication code, the second message authentication code is obtained before the first message authentication code is obtained. Likewise, if the second input parameter includes the some or all code segments of the first message authentication code, the first message authentication code is obtained before the second message authentication code is obtained.

By using one or a combination of the foregoing manners, the terminal device may obtain the first message authentication code and/or the second message authentication code, and may further obtain the reference message authentication code.

In an implementation, the second information may further include related information of the first input parameter and/or related information of the second input parameter.

For example, when the first input parameter includes the first key, the second information may further include a first key set identifier. In other words, the related information of the first input parameter includes the first key set identifier. The first key set identifier may be used to indicate a first root key. The first root key may be a root key shared between a network side and the terminal device, for example, a key generated after authentication performed by the network side on the terminal device succeeds. Alternatively, the first key set identifier may be used to identify a root key of the first key. For example, after network authentication succeeds, the terminal device may receive a first key set identifier sent by a network side device. The terminal device may determine, based on the first key set identifier, a root key identified by the first key set identifier, may further determine a first key based on the root key, and uses the first key as one of the first input parameter. Correspondingly, the AMF may determine, based on the first key set identifier in the second information, the root key identified by the first key set identifier, and further determine the first key based on the root key. The AMF may use the first key as an input parameter, to obtain the first message authentication code.

The AMF and the terminal device may determine the first key based on the first key set identifier in a same manner.

Alternatively, when the second input parameter includes the second key, the second information may further include a second key set identifier. In other words, the related information of the second input parameter includes the second key set identifier. The second key set identifier may be used to indicate a second root key. The second root key may be a root key shared between the network side and the terminal device, for example, the key generated after authentication performed by the network side on the terminal device succeeds. Alternatively, the second key set identifier may be used to identify a root key of the second key. For example, after network authentication succeeds, the terminal device may receive a second key set identifier sent by the network side device. The terminal device may determine, based on the second key set identifier, a root key identified by the second key set identifier, may further determine a second key based on the root key, and uses the second key as one of the second input parameter. Correspondingly, the SMF may determine, based on the second key set identifier, the root key identified by the second key set identifier, and further determine the second key based on the root key. The SMF may use the second key as an input parameter, to obtain the second message authentication code. The SMF and the terminal device may determine the second key based on the second key set identifier in a same manner.

It should be noted that the first root key may be the same as the second root key.

Alternatively, when the first input parameter includes the first key and the second input parameter includes the second key, a key set identifier included in the second information may be a third key set identifier. In other words, a related parameter of the first input parameter or a related parameter of the second input parameter includes the third key set identifier. The third key set identifier may be used to separately indicate the first root key and the second root key. For example, when the first key identifier is the same as the second key identifier, the third key set identifier may be the first key set identifier or the second key set identifier. For another example, when the first key identifier and the second key identifier are different, the third key set identifier may be a combination of the first key set identifier and the second key set identifier. For still another example, when the first root key is the same as the second root key, the third key set identifier may be used to identify the first root key or the second root key. Correspondingly, the AMF determines the first root key based on the third key set identifier, and determines the first key based on the first root key. The SMF determines the second root key based on the third key set identifier, and determines the second key based on the second root key.

If the second information includes any one of the foregoing key set identifiers, the key set identifier may be carried in the KSI information element in the service request message. A length of the key set identifier is less than or equal to a length of the KSI information element. For example, when the third key set identifier is the combination of the first key set identifier and the second key set identifier, a total length of the first key set identifier and the second key set identifier is less than or equal to the length of the KSI information element. For another example, a length of the first key set identifier or a length of the second key set identifier is less than or equal to the length of the KSI information element.

For example, when the first input parameter includes the first count value, the second information may further include a first field in the first count value. A length of the first field may be less than or equal to a second preset length, and the second preset length may be determined based on a length of the SN information element in the service request message. For example, the second preset length may be less than or equal to the length of the SN information element. Correspondingly, the AMF may obtain the complete first count value based on a field included in the second information. For example, the first field may be a low-order field in the first count value, and the AMF may obtain, based on the first field, the first count value used by the terminal device. Further, the AMF may obtain the first message authentication code based on the first count value and the first algorithm. In other words, the related parameter of the first input parameter includes the first field in the first count value.

Alternatively, when the second input parameter includes the second count value, the second information may further include a second field in the second count value. A length of the second field may be less than or equal to the second preset length. Correspondingly, the SMF may obtain, based on the second field in the second information, the second count value used by the terminal device. Further, the SMF may obtain the second message authentication code based on the second count value and the second algorithm. In other words, the related parameter of the second input parameter includes the second field in the second count value.

Alternatively, when the first input parameter includes the first count value, and the second input parameter includes the second count value, the second information may further include any one of a first field in the first count value, a second field in the second count value, or a third field. In a case, when the first count value is the same as the second count value and the first field is the same as the second field, the second information may include the first field or the second field. In another case, when there is a mapping relationship between the first count value and the second count value, there is also a mapping relationship between the first field and the second field, and the second information may include only the first field or the second field. In addition to the foregoing cases, the second information may include the third field, and the third field is obtained based on the first field and the second field. For example, the third field may be obtained by splicing the first field and the second field, and a third count value may also be obtained by splicing some fields in the first field and some fields in the second field. This is not limited herein in this embodiment of the application.

If the second information includes any one of the foregoing fields, the field may be carried in the SN information element in the service request message. A length of the field may be less than or equal to the length of the SN information element.

Certainly, the second information may further include a combination of the foregoing parameters. For example, the second information may include both the third key set identifier and the third field. This is not limited herein.

Correspondingly, if the second information includes any one or more pieces of the foregoing parameter information, the method may further include: The AMF may obtain the first message authentication code based on parameter information included in the second information; and the SMF may obtain the second message authentication code based on the parameter information included in the second information.

In the foregoing manner, the second information in the service request message can be fully used to carry parameter information related to an input parameter, so that the AMF or the SMF can obtain a corresponding message authentication code based on the parameter information, to check the service request message. No additional signaling is required for notifying the AMF or the SMF of a related input parameter, to reduce inter-system signaling overheads.

Optionally, the method further includes: When a check result of the AMF is that the check succeeds, the AMF sends, to the SMF, the result that the check succeeds. If the SMF receives the result that the check succeeds and that is sent by the AMF, the SMF may check the service request message. In other words, after receiving the result that the check succeeds and that is sent by the AMF, the SMF performs operation S207.

In the foregoing manner, the SMF may learn of the check result of the AMF.

Optionally, the method further includes: When the check performed by the SMF on the service request message succeeds, the SMF may further manage a session of the terminal device. For example, the SMF may create a session for the terminal device, so that the terminal device can send uplink data or receive downlink data. Alternatively, the SMF may modify a current session of the terminal device, release the current session of the terminal device, or the like.

Optionally, the method further includes: The AMF receives a check result of the SMF. For example, when the check result that is of the SMF and that is received by the AMF is that the check fails, the AMF may send an acceptance message or a rejection message to the terminal device based on the check result of the SMF. Specifically, when the check result of the AMF is that the check succeeds and the check result of the SMF is that the check succeeds, the AMF may send the acceptance message to the terminal device. When at least one of the check result of the AMF or the check result of the SMF is that the check fails, the AMF may send the rejection message to the terminal device. The acceptance message is used to indicate that the AMF and the SMF accept the service request message. The rejection message is used to indicate that the AMF and the SMF reject the service request message.

In the foregoing manner, the AMF may learn of the check result of the SMF.

Figure 4:
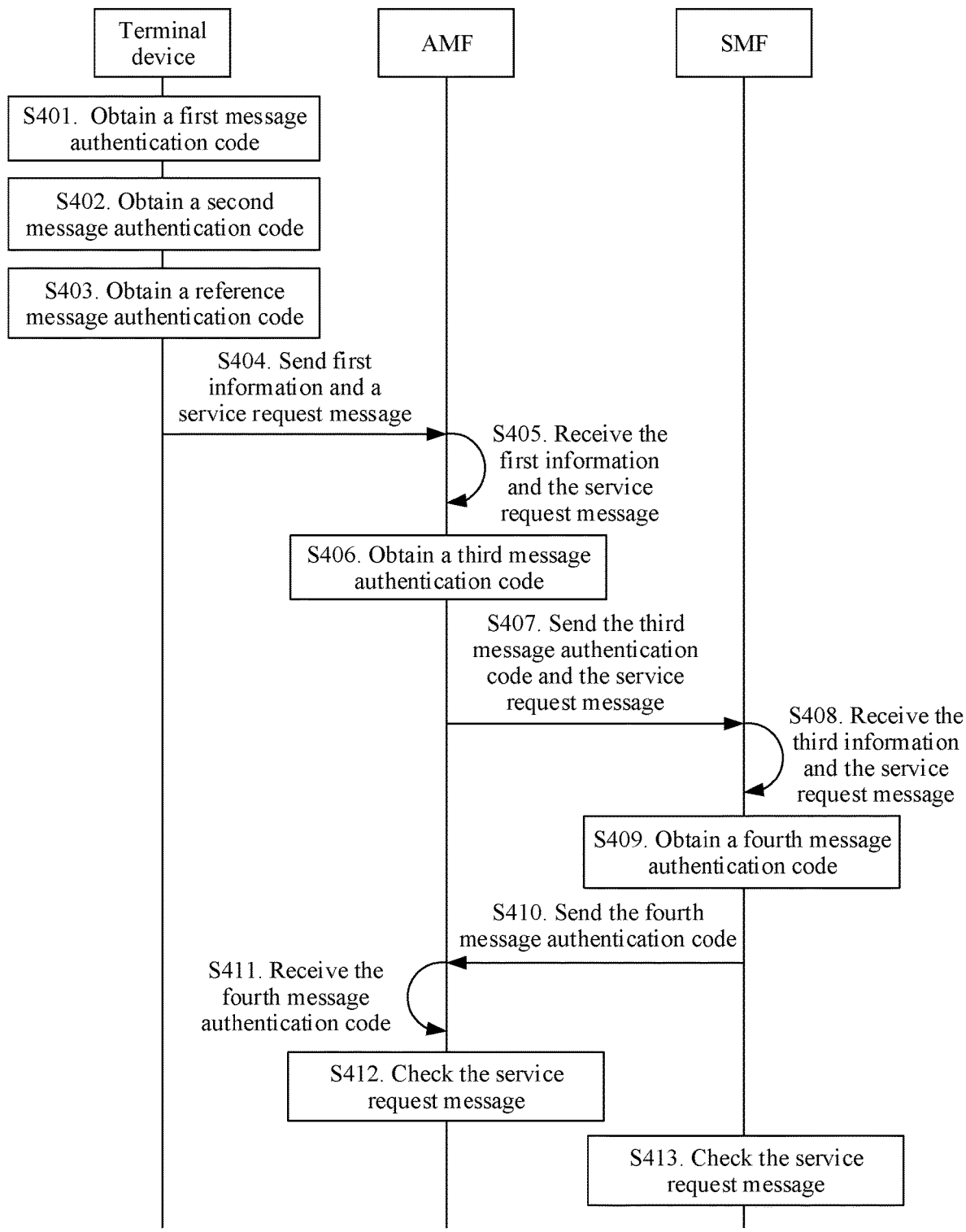
FIG. 4 is a schematic flowchart of another communication method according to an embodiment of the application.

FIG. 4 is a schematic flowchart of another communication method according to an embodiment of the application. As shown in FIG. 4, the method includes at least the following operations.

Operation S401: A terminal device obtains a first message authentication code based on a first input parameter and a first algorithm.

Operation S402: The terminal device obtains a second message authentication code based on a second input parameter and a second algorithm.

A sequence of performing operation S401 and operation S402 is not limited in this embodiment of the application. For implementations of operation S401 and operation S402, refer to corresponding descriptions in the foregoing embodiment. Details are not described herein again.

Operation S403: A terminal device obtains a reference message authentication code based on the first message authentication code, the second message authentication code, and a hash algorithm.

For an implementation of operation S403, refer to Manner 1 or Manner 2 in corresponding descriptions in the foregoing embodiment. Details are not described herein again.

Operation S404: The terminal device sends first information and a service request message to an AMF, where the service request message includes second information, and the second information includes the reference message authentication code.

Operation S405: The AMF receives the first information and the service request message.

The AMF may sequentially receive the first information and the service request message. Alternatively, the AMF may receive a first request message sent by the terminal device, and the first request message carries the first information and the service request message. This is not limited herein.

Operation S406: The AMF obtains a third message authentication code based on the second information and the first algorithm.

A manner in which the AMF obtains the third message authentication code may be the same as a manner in which the terminal device obtains the first message authentication code. For details, refer to descriptions in the foregoing embodiment.

Operation S407: The AMF sends the third message authentication code and the service request message to an SMF based on the first information.

Optionally, in operation S407, the AMF sends only the service request message.

Operation S408: The SMF receives the third information and the service request message.

Optionally, when the AMF sends only the service request message in operation S407, the SMF receives the service request message in operation S408.

Operation S409: The SMF obtains a fourth message authentication code based on the second information and the second algorithm.

A manner in which the SMF obtains the fourth message authentication code may be the same as a manner in which the terminal device obtains the second message authentication code. For details, refer to descriptions in the foregoing embodiment.

Operation S410: The SMF sends the fourth message authentication code to the AMF.

Operation S411: The AMF receives the fourth message authentication code.

Operation S412: The AMF checks the service request message based on the third message authentication code, the fourth message authentication code, and the reference message authentication code.

For example, the AMF obtains a to-be-compared message authentication code based on the third message authentication code, the fourth message authentication code, and the hash algorithm. A manner in which the AMF obtains the to-be-compared message authentication code is the same as a manner in which the terminal device obtains the reference message authentication code, and the AMF may obtain the to-be-compared message authentication code in Manner 1 or Manner 2.

For a check manner used by the AMF, refer to corresponding descriptions in the foregoing embodiment. Details are not described herein again.

Optionally, if the AMF sends only the service request message in operation S407, the method may further include: After the check performed by the AMF succeeds, the AMF sends the third message authentication code to the SMF. When receiving the third message authentication code, the SMF may learn that the check performed by the AMF succeeds.

Operation S413: The SMF checks the service request message based on the third message authentication code, the fourth message authentication code, and the reference message authentication code.

For example, the SMF obtains the to-be-compared message authentication code based on the third message authentication code, the fourth message authentication code, and the hash algorithm. A manner in which the SMF obtains the to-be-compared message authentication code is the same as the manner in which the terminal device obtains the reference message authentication code, and the SMF may obtain the to-be-compared message authentication code in Manner 1 or Manner 2.

For an implementation of another operation in this embodiment, refer to corresponding descriptions in the foregoing embodiment. Details are not described herein again.

In the foregoing manner, the AMF and the SMF may exchange respectively obtained message authentication codes, so that the AMF and the SMF separately check the service request message.

Figure 5:
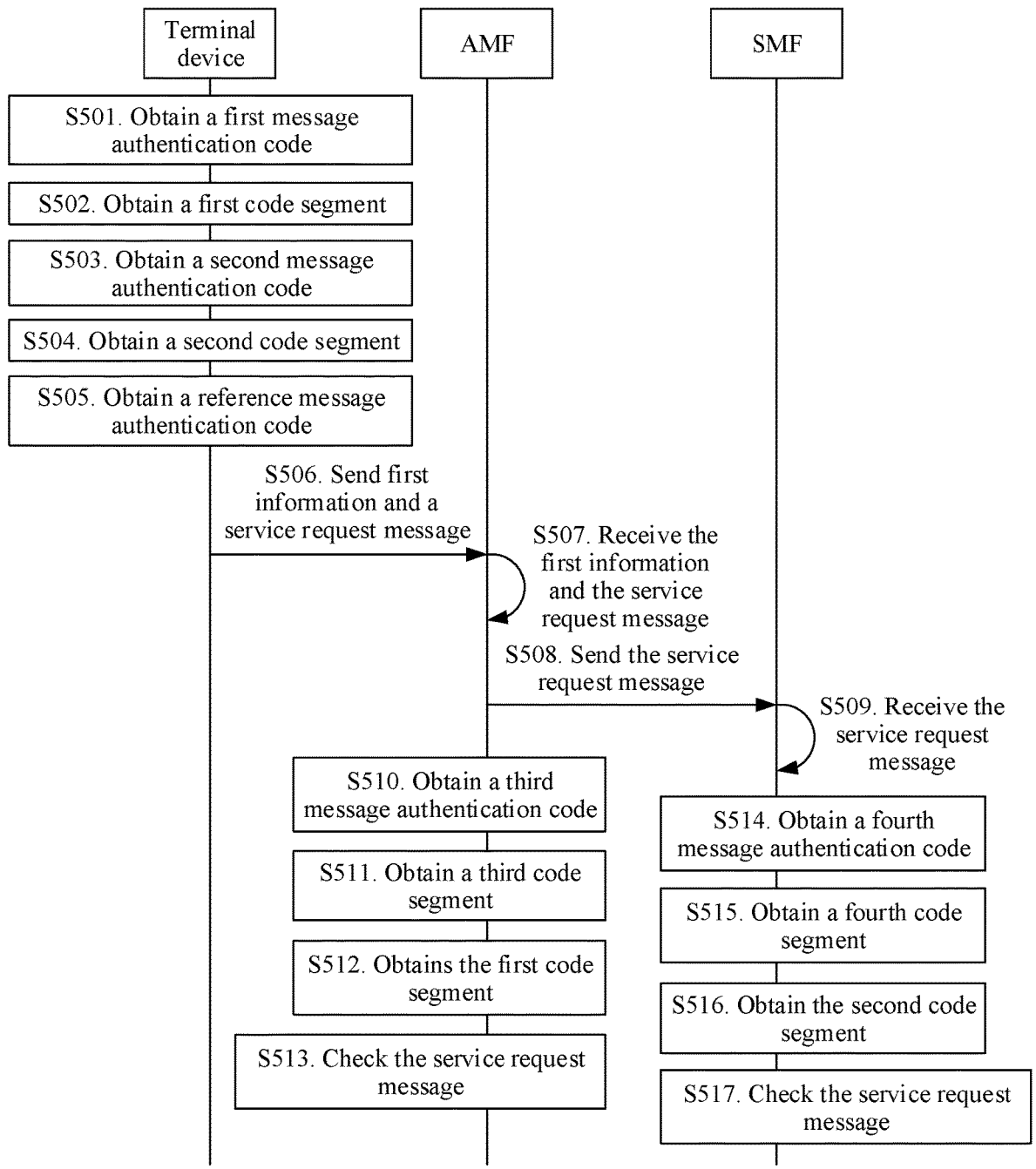
FIG. 5 is a schematic flowchart of still another communication method according to an embodiment of the application.

FIG. 5 is a schematic flowchart of still another communication method according to an embodiment of the application. As shown in FIG. 5, the method includes at least the following operations.

Operation S501: A terminal device obtains a first message authentication code based on a first input parameter and a first algorithm.

Operation S502: The terminal device obtains a first code segment based on the first message authentication code.

Operation S503: The terminal device obtains a second message authentication code based on a second input parameter and a second algorithm.

Operation S504: The terminal device obtains a second code segment based on the second message authentication code.

A sequence of performing operations S501 and S502 and operations S503 and S504 is not limited in this embodiment of the application.

Operation S505: The terminal device splices the first code segment and the second code segment, to obtain a reference message authentication code.

For implementations of operation S501 to operation S505, refer to corresponding descriptions in the foregoing embodiment. Details are not described herein again.

Operation S506: The terminal device sends first information and a service request message to an AMF, where the service request message includes second information, and the second information includes the reference message authentication code.

Operation S507: The AMF receives the first information and the service request message.

Operation S508: The AMF sends the service request message to an SMF based on the first information.

Operation S509: The SMF receives the service request message.

Operation S510: The AMF obtains a third message authentication code based on the second information and the first algorithm.

Operation S511: The AMF obtains a third code segment based on the third message authentication code.

A manner in which the AMF obtains the third code segment may be the same as a manner in which the terminal device obtains the first code segment.

Operation S512: The AMF obtains the first code segment based on the reference message authentication code.

Because the reference message authentication code is obtained by splicing the first code segment and the second code segment, the AMF may correspondingly obtain the first code segment from the reference message authentication code after learning this splice manner.

Operation S513: The AMF checks the service request message based on the third code segment and the first code segment.

For example, for a manner of checking a code segment by the AMF, refer to the foregoing check manner. Details are not described herein again.

Operation S514: The SMF obtains a fourth message authentication code based on the second information and the second algorithm.

Operation S515: The SMF obtains a fourth code segment based on the fourth message authentication code.

Operation S516: The SMF obtains the second code segment based on the reference message authentication code.

Operation S517: The SMF checks the service request message based on the fourth code segment and the second code segment.

Optionally, operation S508 may be performed after operation S513. To be specific, the AMF checks the service request message in operation S513. If the check succeeds, the AMF sends the service request message to the SMF. When receiving the service request message, the SMF may learn that the check performed by the AMF succeeds.

For an implementation of another operation in this embodiment, refer to corresponding descriptions in the foregoing embodiment. Details are not described herein again.

In the foregoing manner, the AMF and the SMF may separately obtain corresponding message authentication codes, to independently check the service request message, and reduce overheads of message transmission between the AMF and the SMF.

Figure 6:
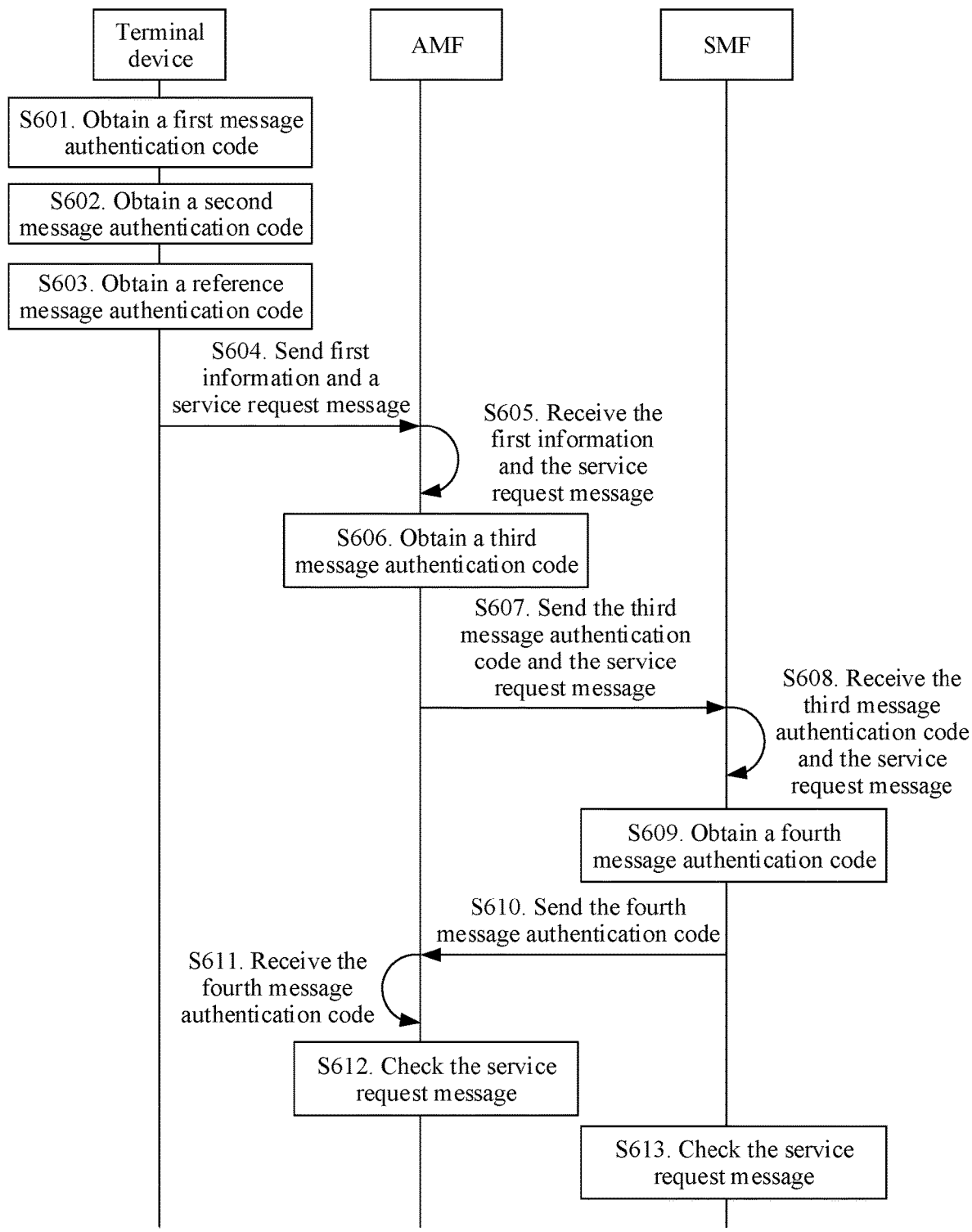
FIG. 6 is a schematic flowchart of still another communication method according to an embodiment of the application.

FIG. 6 is a schematic flowchart of still another communication method according to an embodiment of the application. As shown in FIG. 6, the method includes at least the following operations.

Operation S601: A terminal device obtains a first message authentication code based on a first input parameter and a first algorithm.

Operation S602: The terminal device obtains a second message authentication code based on a second input parameter and a second algorithm, where the second input parameter includes some or all code segments of the first message authentication code.

Operation S603: The terminal device obtains a reference message authentication code based on the first message authentication code, the second message authentication code, and a hash function.

Operation S604: The terminal device sends first information and a service request message to an AMF, where the service request message includes second information, and the second information includes the reference message authentication code.

Operation S605: The AMF receives the first information and the service request message.

Operation S606: The AMF obtains a third message authentication code based on the second information and the first algorithm.

Operation S607: The AMF sends the third message authentication code and the service request message to an SMF.

Operation S608: The SMF receives the third message authentication code and the service request message.

Operation S609: The SMF obtains a fourth message authentication code based on the third message authentication code, the second information, and the second algorithm.

For example, the AMF or the SMF may obtain, from the third message authentication code, a code segment that is used as an input parameter. An obtaining manner may be the same as a manner in which the terminal device obtains, from the first message authentication code, a code segment that is used as an input parameter.

Operation S610: The SMF sends the fourth message authentication code to the AMF.

Operation S611: The AMF receives the fourth message authentication code.

Operation S612: The AMF checks the service request message based on the third message authentication code, the fourth message authentication code, and the reference message authentication code.

Operation S613: The SMF checks the service request message based on the third message authentication code, the fourth message authentication code, and the reference message authentication code.

Optionally, operation S613 may be performed before operation S610. To be specific, the SMF may first check the service request message, and if the check succeeds, the SMF sends the fourth message authentication code to the AMF. In this case, when receiving the fourth message authentication code, the AMF may learn that the check performed by the SMF succeeds.

For an implementation of another operation in this embodiment, refer to corresponding descriptions in the foregoing embodiment. Details are not described herein again.

In the foregoing manner, the SMF needs to obtain a message authentication code of the SMF based on a message authentication code of the AMF, and the reference message authentication code is obtained based on the first message authentication code, the second message authentication code, and the hash function.

Figure 7:
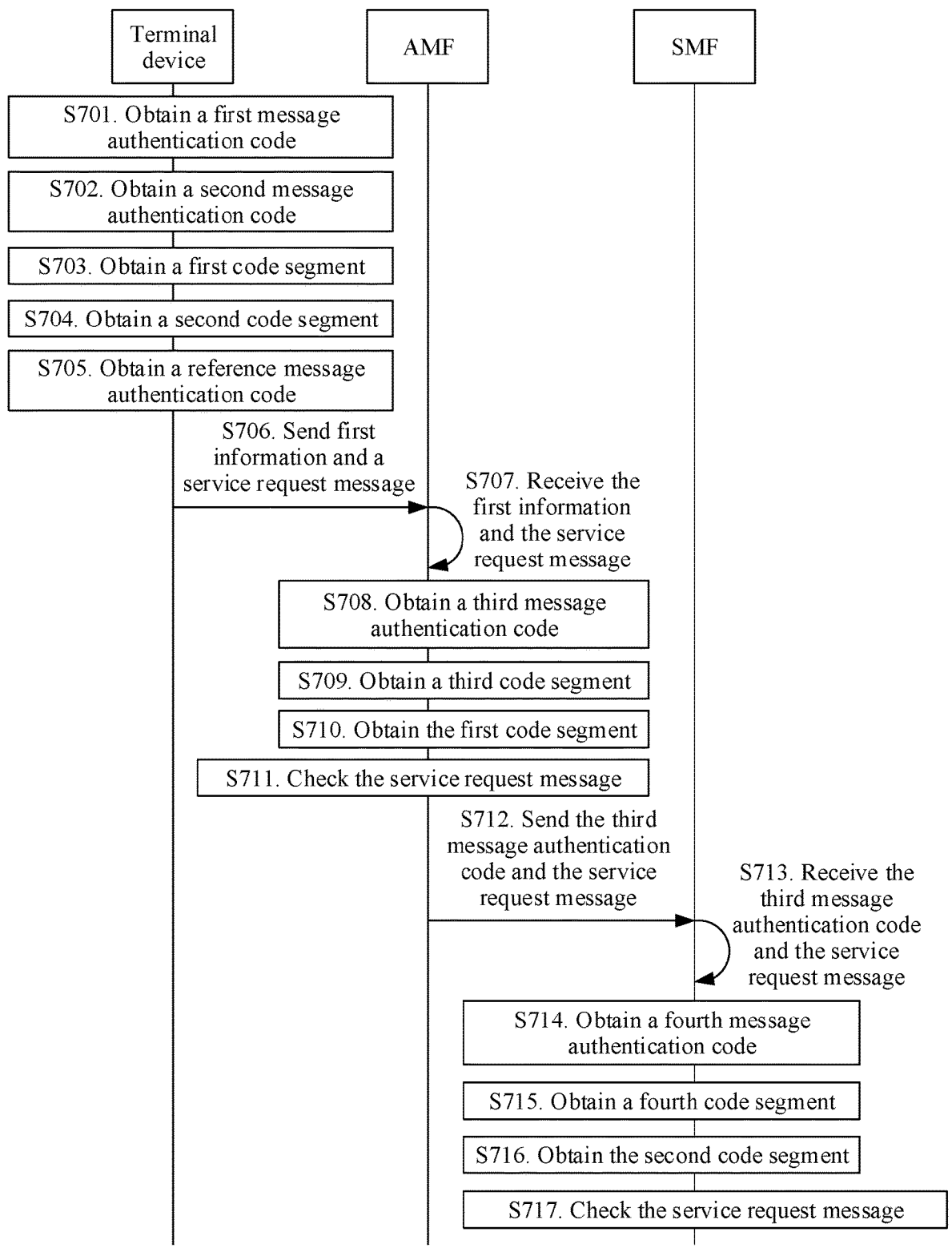
FIG. 7 is a schematic flowchart of still another communication method according to an embodiment of the application.

FIG. 7 is a schematic flowchart of still another communication method according to an embodiment of the application. As shown in FIG. 7, the method includes at least the following operations:

Operation S701: A terminal device obtains a first message authentication code based on a first input parameter and a first algorithm.

Operation S702: The terminal device obtains a second message authentication code based on a second input parameter and a second algorithm, where the second input parameter includes some or all code segments of the first message authentication code.

Operation S703: The terminal device obtains a first code segment based on the first message authentication code.

Operation S704: The terminal device obtains a second code segment based on the second message authentication code.

Operation S705: The terminal device splices the first code segment and the second code segment, to obtain a reference message authentication code.

Operation S706: The terminal device sends first information and a service request message to an AMF, where the service request message includes second information, and the second information includes the reference message authentication code.

Operation S707: The AMF receives the first information and the service request message.

Operation S708: The AMF obtains a third message authentication code based on the second information and the first algorithm.

Operation S709: The AMF obtains a third code segment based on the third message authentication code.

Operation S710: The AMF obtains the first code segment based on the reference message authentication code.

Operation S711: The AMF checks the service request message based on the first code segment and the third code segment.

Operation S712: The AMF sends the third message authentication code and the service request message to an SMF.

Operation S713: The SMF receives the third message authentication code and the service request message.

Operation S714: The SMF obtains a fourth message authentication code based on the third message authentication code, the second information, and the second algorithm.

Operation S715: The SMF obtains a fourth code segment based on the fourth message authentication code.

Operation S716: The SMF obtains the second code segment based on the reference message authentication code.

Operation S717: The SMF checks the service request message based on the second code segment and the fourth code segment.

For an implementation of performing the operations in this embodiment, refer to corresponding descriptions in the foregoing embodiment. Details are not described herein again.

In the foregoing manner, the SMF needs to obtain a message authentication code of the SMF based on a message authentication code of the AMF, and the reference message authentication code is obtained by splicing the first code segment of the first message authentication code and the second code segment of the second message authentication code.

Figure 8:
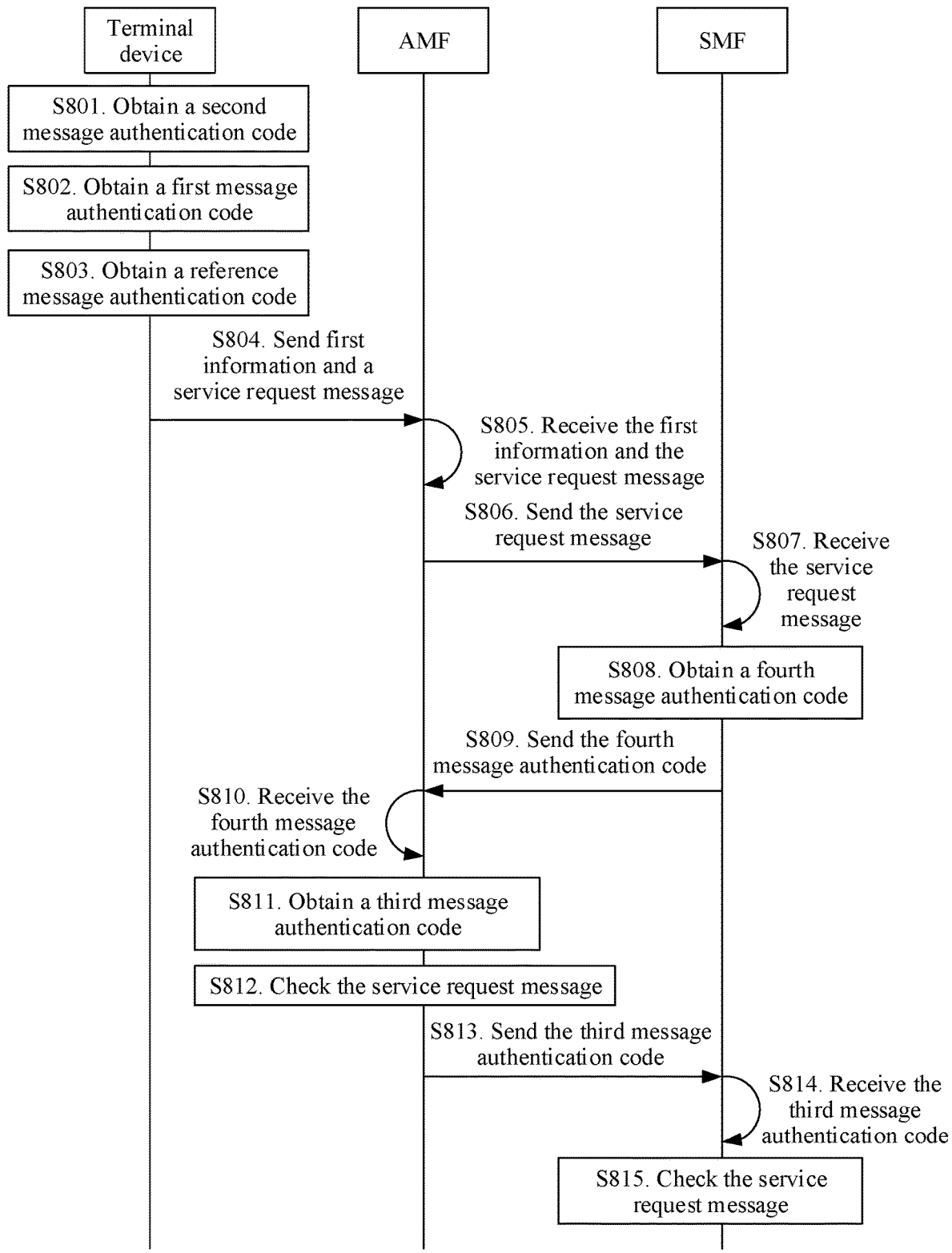
FIG. 8 is a schematic flowchart of still another communication method according to an embodiment of the application.

FIG. 8 is a schematic flowchart of still another communication method according to an embodiment of the application. As shown in FIG. 8, the method includes at least the following operations:

Operation S801: A terminal device obtains a second message authentication code based on a second input parameter and a second algorithm.

Operation S802: The terminal device obtains a first message authentication code based on a first input parameter and a first algorithm, where the first input parameter includes some or all code segments of the second message authentication code.

Operation S803: The terminal device obtains a reference message authentication code based on the first message authentication code and the second message authentication code.

Operation S804: The terminal device sends first information and a service request message to an AMF, where the service request message includes second information, and the second information includes the reference message authentication code.

Operation S805: The AMF receives the first information and the service request message.

Operation S806: The AMF sends the service request message to an SMF based on the first information.

Operation S807: The SMF receives the service request message.

Operation S808: The SMF obtains a fourth message authentication code based on the second information and the second algorithm.

Operation S809: The SMF sends the fourth message authentication code to the AMF.

Operation S810: The AMF receives the fourth message authentication code.

Operation S811: The AMF obtains a third message authentication code based on the fourth message authentication code, the second information, and the first algorithm.

Operation S812: The AMF checks the service request message based on the fourth message authentication code, the third message authentication code, and the reference message authentication code.

Operation S813: The AMF sends the third message authentication code to the SMF.

Operation S814: The SMF receives the third message authentication code.

Operation S815: The SMF checks the service request message based on the third message authentication code, the fourth message authentication code, and the reference message authentication code.

Optionally, operation S813 may be performed before operation S812. To be specific, after obtaining the third message authentication code, the AMF may send the third message authentication code to the SMF, and then check the service request message. In this case, the foregoing method may further include: The AMF sends a check result to the SMF. If the check result received by the SMF is that the check succeeds, the SMF checks the service request message.

For an implementation of another operation in this embodiment, refer to corresponding descriptions in the foregoing embodiment. Details are not described herein again.

In the foregoing manner, the AMF needs to obtain a message authentication code of the AMF based on a message authentication code of the SMF, and the reference message authentication code is obtained based on the first message authentication code, the second message authentication code, and a hash function.

Figure 9A:
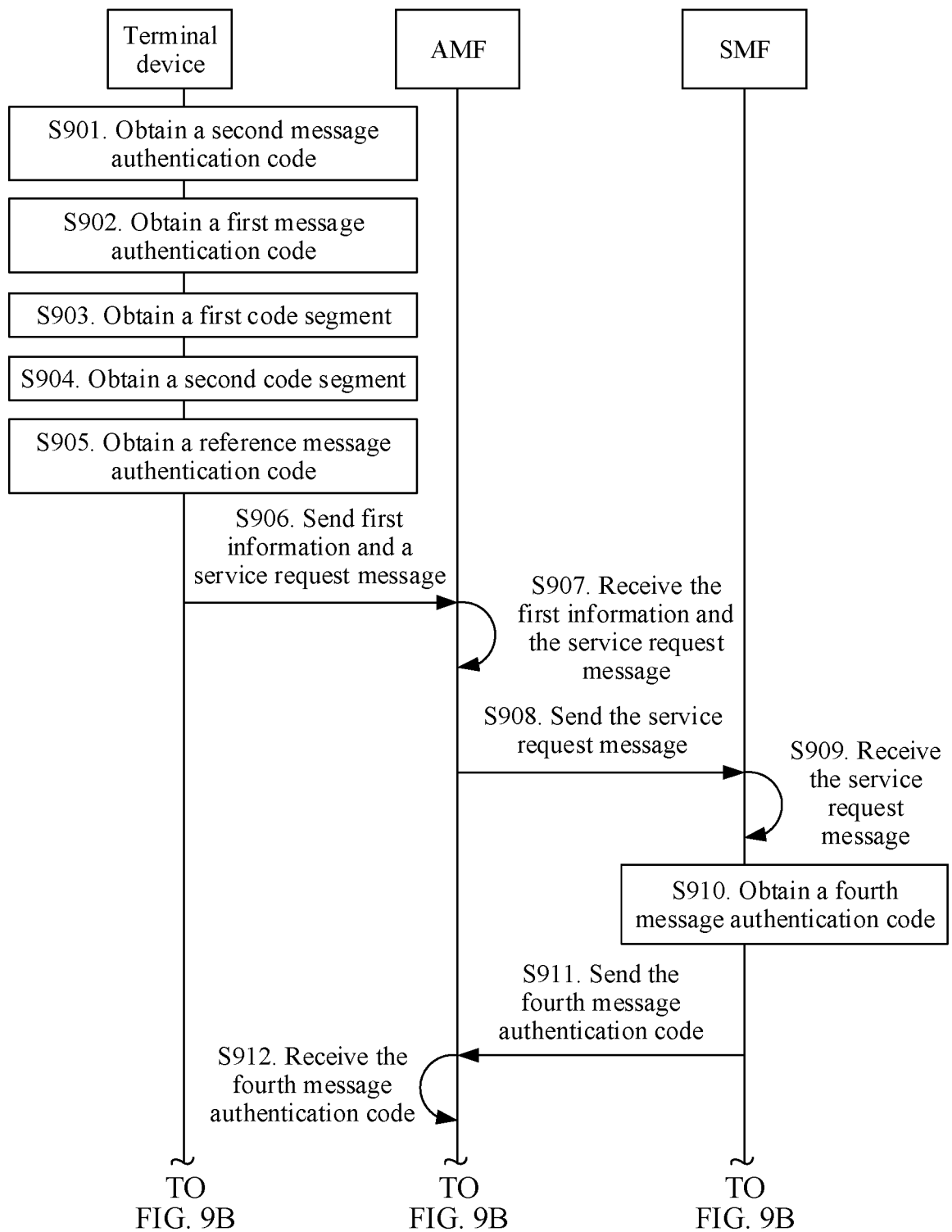
FIGS. 9A and 9B are a schematic flowchart of still another communication method according to an embodiment of the application.
Figure 9B:
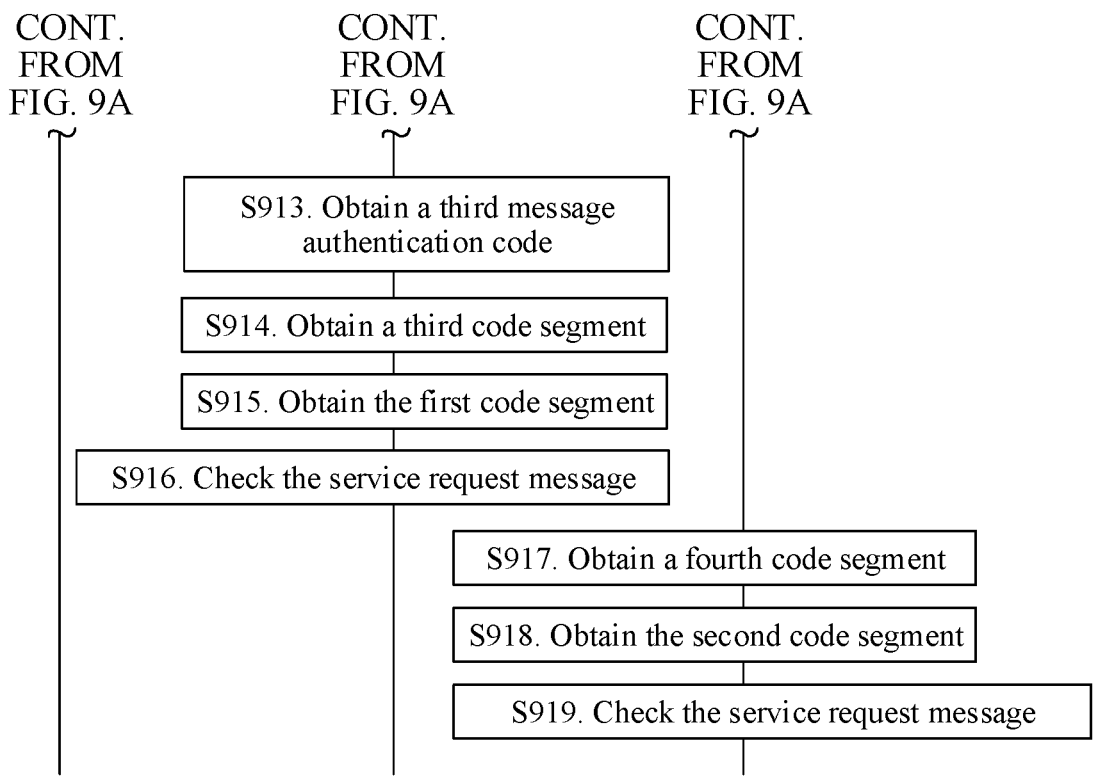

FIGS. 9A and 9B are a schematic flowchart of still another communication method according to an embodiment of the application. As shown in FIGS. 9A and 9B, the method includes at least the following operations:

Operation S901: A terminal device obtains a second message authentication code based on a second input parameter and a second algorithm.

Operation S902: The terminal device obtains a first message authentication code based on a first input parameter and a first algorithm, where the first input parameter includes some or all code segments of the second message authentication code.

Operation S903: The terminal device obtains a first code segment based on the first message authentication code.

Operation S904: The terminal device obtains a second code segment based on the second message authentication code.

Operation S905: The terminal device splices the first code segment and the second code segment, to obtain a reference message authentication code.

Operation S906: The terminal device sends first information and a service request message to an AMF, where the service request message includes second information, and the second information includes the reference message authentication code.

Operation S907: The AMF receives the first information and the service request message.

Operation S908: The AMF sends the service request message to an SMF based on the first information.

Operation S909: The SMF receives the service request message.

Operation S910: The SMF obtains a fourth message authentication code based on the second information and the second algorithm.

Operation S911: The SMF sends the fourth message authentication code to the AMF.

Operation S912: The AMF receives the fourth message authentication code.

Operation S913: The AMF obtains a third message authentication code based on the fourth message authentication code, the second information, and the first algorithm.

Operation S914: The AMF obtains a third code segment based on the third message authentication code.

Operation S915: The AMF obtains the first code segment based on the reference message authentication code.

Operation S916: The AMF checks the service request message based on the first code segment and the third code segment.

Operation S917: The SMF obtains a fourth code segment based on the fourth message authentication code.

Operation S918: The SMF obtains the second code segment based on the reference message authentication code.

Operation S919: The SMF checks the service request message based on the second code segment and the fourth code segment.

A sequence of performing operations S912 to S916 and operations S917 to S919 is not limited in this embodiment of the application.

Optionally, the method may further include: If a check result of the SMF is that the check fails, the SMF sends, to the AMF, the result that the check fails.

Optionally, operations S917 to S919 may be performed before operation S911. In an implementation, the SMF sends the fourth message authentication code to the AMF after the check performed by the SMF succeeds. When receiving the fourth message authentication code, the AMF may learn that the check performed by the SMF succeeds.

For an implementation of performing the operations in this embodiment, refer to corresponding descriptions in the foregoing embodiment. Details are not described herein again.

In the foregoing manner, the AMF needs to obtain a message authentication code of the AMF based on a message authentication code of the SMF, and the reference message authentication code is obtained by splicing the first code segment of the first message authentication code and the second code segment of the second message authentication code.

Figure 10:
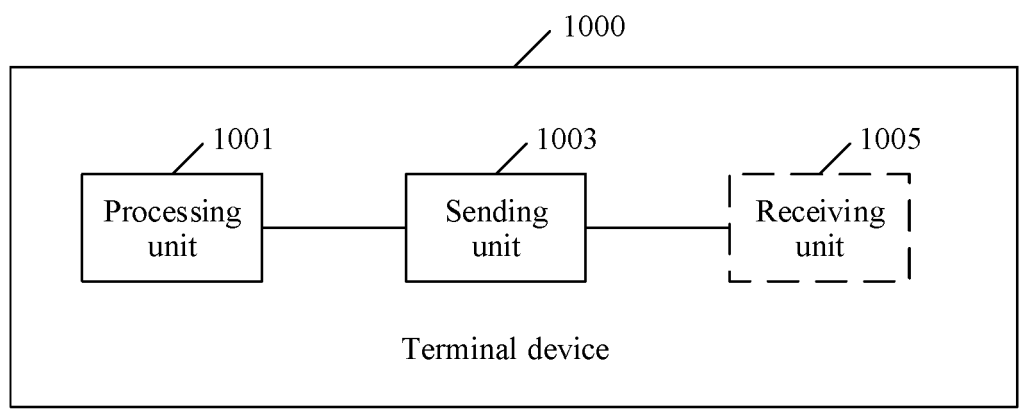
FIG. 10 is a schematic composition diagram of units of a terminal device according to an embodiment of the application.

FIG. 10 is a composition diagram of units of a terminal device according to an embodiment of the application. The terminal device 1000 may be the terminal device in the foregoing method embodiments. To be specific, the terminal device may be configured to perform an action of the terminal device in the foregoing method embodiments. As shown in FIG. 10, the terminal device 1000 may include a processing unit 1001 and a sending unit 1003. The terminal device 1000 may further include a receiving unit 1005. The receiving unit 1005 may be configured to receive a check result, another message, or an instruction sent by an AMF or an SMF. This is not limited herein.

The processing unit 1001 is configured to obtain a reference message authentication code based on a first message authentication code and a second message authentication code. The first message authentication code is used by an access and mobility management function AMF to check a service request message, and the second message authentication code is used by a session management function SMF to check the service request message.

The sending unit 1003 is configured to send first information and the service request message to the AMF. The first information is used to instruct the AMF to send the service request message to the SMF, the service request message includes second information, and the second information includes the reference message authentication code.

Specifically, for an implementation in which the processing unit 1001 obtains the reference message authentication code, refer to corresponding descriptions in the foregoing method embodiments. Details are not described herein again.

In an embodiment, the terminal device 1000 is presented in a form of a unit. The "unit" herein may be an application-specific integrated circuit (ASIC), a processor and a memory that execute one or more software or firmware programs, an integrated logic circuit, and/or another device that can provide the foregoing functions. Functions of the foregoing units may be implemented by the following terminal device 1300.

Figure 11:
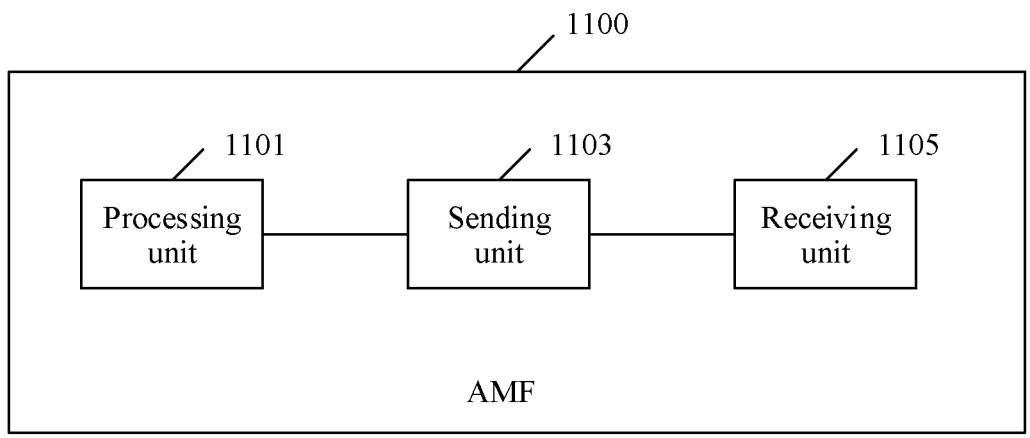
FIG. 11 is a schematic composition diagram of units of an access and mobility management function AMF according to an embodiment of the application.

FIG. 11 is a composition diagram of units of an access and mobility management function AMF 1100 according to an embodiment of the application. The AMF 1100 may be the AMF in the foregoing method embodiments. To be specific, the AMF may be configured to perform an action of the AMF in the foregoing method embodiments. As shown in FIG. 11, the AMF 1100 may include a processing unit 1101, a sending unit 1103, and a receiving unit 1105.

The receiving unit 1105 is configured to receive first information and a service request message that are sent by a terminal device. The first information is used to instruct the AMF to send the service request message to a session management function SMF, the service request message includes second information, and the second information includes a reference message authentication code.

The sending unit 1103 is configured to send the service request message to the SMF based on the first information.

The processing unit 1101 is configured to check the service request message based on the second information.

Optionally, the foregoing units are further configured to implement the method performed by the AMF in the foregoing method embodiments. Details are not described herein again.

In an embodiment, the AMF 1100 is presented in a form of a unit. The "unit" herein may be an application-specific integrated circuit (ASIC), a processor and a memory that execute one or more software or firmware programs, an integrated logic circuit, and/or another device that can provide the foregoing functions. Functions of the foregoing units may be implemented by the following AMF 1400.

Figure 12:
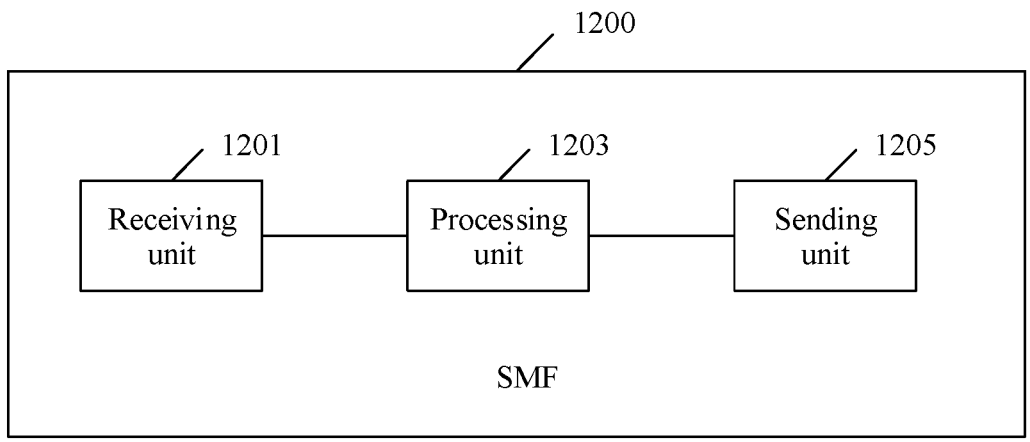
FIG. 12 is a schematic composition diagram of units of a session management function SMF according to an embodiment of the application.

FIG. 12 is a composition diagram of units of a session management function SMF 1200 according to an embodiment of the application. The SMF 1200 may be the SMF in the foregoing method embodiments. To be specific, the SMF may be configured to perform an action of the SMF in the foregoing method embodiments. As shown in FIG. 12, the SMF 1200 may include a receiving unit 1201 and a processing unit 1203. The SMF 1200 may further include a sending unit 1205. The sending unit 1205 may be configured to send a check result, another message, or an instruction to the foregoing terminal device or the foregoing AMF. This is not limited herein.

The receiving unit 1201 is configured to receive a service request message from an access and mobility management function AMF. The service request message includes second information, and the second information includes a reference message authentication code.

The processing unit 1203 is configured to check the service request message based on the second information.

Optionally, the foregoing units are further configured to implement the method performed by the SMF in the foregoing method embodiments. Details are not described herein again.

In an embodiment, the SMF 1200 is presented in a form of a unit. The "unit" herein may be an application-specific integrated circuit (ASIC), a processor and a memory that execute one or more software or firmware programs, an integrated logic circuit, and/or another device that can provide the foregoing functions. Functions of the foregoing units may be implemented by the following SMF 1500.

Figure 13:
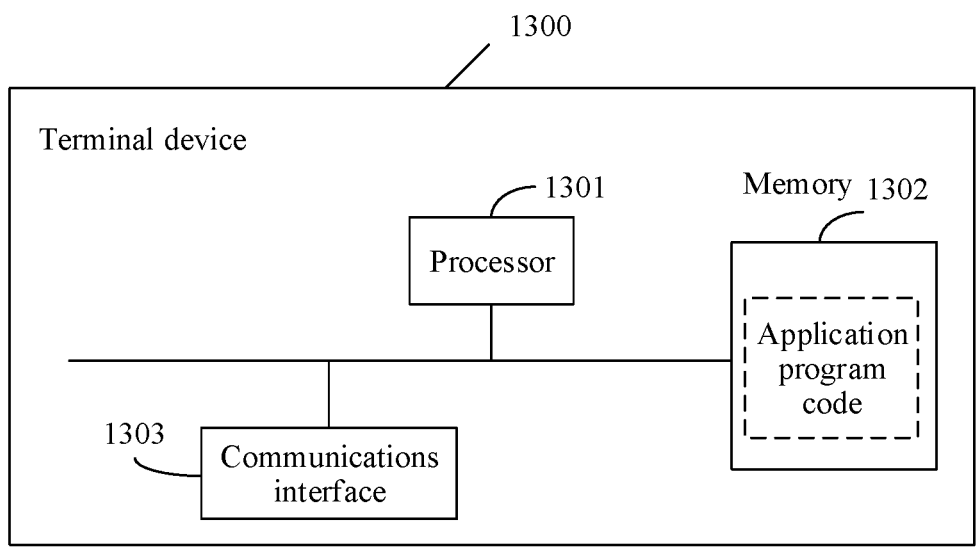
FIG. 13 is a schematic structural diagram of a terminal device according to an embodiment of the application.

FIG. 13 shows a terminal device 1300 according to some embodiments of the application. The terminal device 1300 includes at least one processor 1301, at least one memory 1302, and at least one communications interface 1303. The processor 1301, the memory 1302, and the communications interface 1303 are connected and complete mutual communication by using a communications bus.

The processor 1301 may be a general-purpose central processing unit (CPU), a microprocessor, an application-specific integrated circuit (ASIC), or one or more integrated circuits for controlling program execution of the foregoing solution.

The communications interface 1303 is configured to communicate with another device or a communications network such as the Ethernet, a radio access network (RAN), or a wireless local area network (WLAN).

The memory 1302 may be a read-only memory (ROM), another type of static storage device that can store static information and a static instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated with the processor.

The memory 1302 is configured to store application program code for executing the foregoing solutions, and the processor 1301 controls the execution. The processor 1301 is configured to execute the application program code stored in the memory 1302.

The code stored in the memory 1302 may be used to perform the method performed by the terminal device provided in the foregoing method embodiments. For example, the method includes: obtaining a reference message authentication code based on a first message authentication code and a second message authentication code, where the first message authentication code is used by an access and mobility management function AMF to check a service request message, and the second message authentication code is used by a session management function SMF to check the service request message; and send first information and the service request message to the AMF, where the first information is used to instruct the AMF to send the service request message to the SMF, the service request message includes second information, and the second information includes the reference message authentication code.

Figure 14:
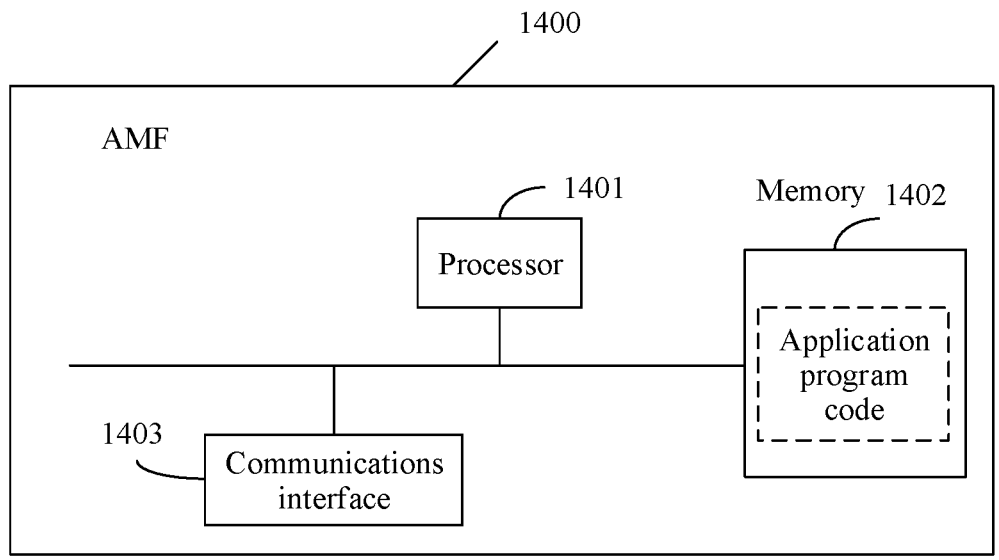
FIG. 14 is a schematic structural diagram of an access and mobility management function AMF according to an embodiment of the application.

FIG. 14 shows an AMF 1400 according to some embodiments of the application. The AMF 1400 includes at least one processor 1401, at least one memory 1402, and at least one communications interface 1403. The processor 1401, the memory 1402, and the communications interface 1403 are connected and complete mutual communication by using a communications bus.

The processor 1401 may be a general-purpose central processing unit (CPU), a microprocessor, an application-specific integrated circuit (ASIC), or one or more integrated circuits for controlling program execution of the foregoing solution.

The communications interface 1403 is configured to communicate with another device or a communications network such as the Ethernet, a radio access network (RAN), or a wireless local area network (WLAN).

The memory 1402 may be a read-only memory (ROM), another type of static storage device that can store static information and a static instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated with the processor.

The memory 1402 is configured to store application program code for executing the foregoing solutions, and the processor 1401 controls the execution. The processor 1401 is configured to execute the application program code stored in the memory 1402.

The code stored in the memory 1402 may be used to perform the method performed by the AMF provided in the foregoing method embodiments. For example, the method includes: receiving first information and a service request message that are sent by a terminal device, where the first information is used to instruct the AMF to send the service request message to a session management function SMF, the service request message includes second information, and the second information includes a reference message authentication code; sending the service request message to the SMF based on the first information; and checking the service request message based on the second information.

Figure 15:
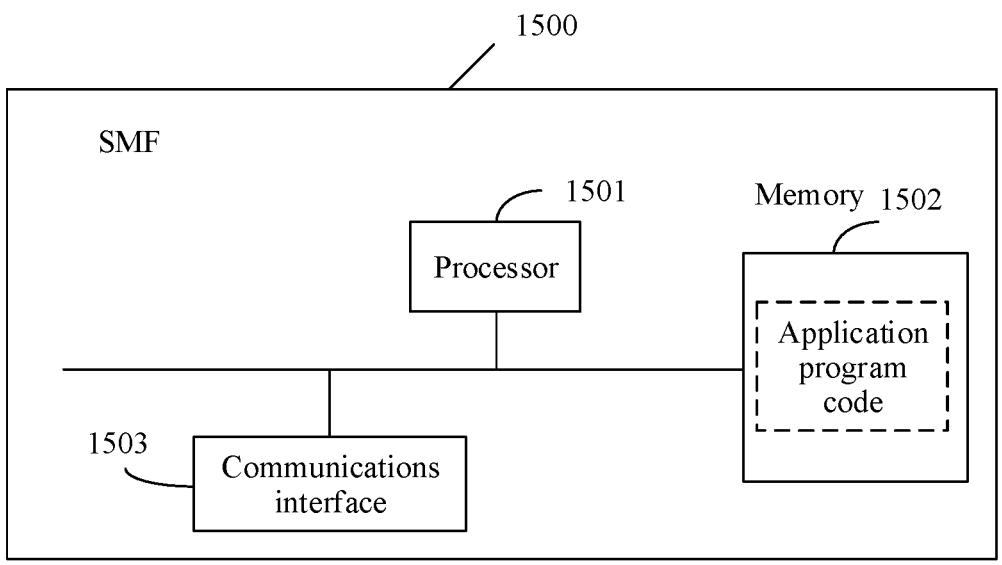
FIG. 15 is a schematic structural diagram of a session management function SMF according to an embodiment of the application.

FIG. 15 shows an SMF 1500 according to some embodiments of the application. The SMF 1500 includes at least one processor 1501, at least one memory 1502, and at least one communications interface 1503. The processor 1501, the memory 1502, and the communications interface 1503 are connected and complete mutual communication by using a communications bus.

The processor 1501 may be a general-purpose central processing unit (CPU), a microprocessor, an application-specific integrated circuit (ASIC), or one or more integrated circuits for controlling program execution of the foregoing solution.

The communications interface 1503 is configured to communicate with another device or a communications network such as the Ethernet, a radio access network (RAN), or a wireless local area network (WLAN).

The memory 1502 may be a read-only memory (ROM), another type of static storage device that can store static information and a static instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated with the processor.

The memory 1502 is configured to store application program code for executing the foregoing solutions, and the processor 1501 controls the execution. The processor 1501 is configured to execute the application program code stored in the memory 1502.

The code stored in the memory 1502 may be used to perform the method performed by the SMF provided in the foregoing method embodiments. For example, the method includes: receiving a service request message from an access and mobility management function AMF, where the service request message includes second information, and the second information includes a reference message authentication code; and checking the service request message based on the second information.

In at least one embodiment, a computer storage medium is provided. The computer storage medium may store a program, and when the program is executed, some or all operations of any communication method in the foregoing method embodiments are performed.

In at least one embodiment, a chip is provided. The chip is configured to implement all or some operations in the embodiments performed by the foregoing terminal device.

In at least one embodiment, a chip is provided. The chip is configured to implement all or some operations in the embodiments performed by the foregoing AMF.

In at least one embodiment, a chip is provided. The chip is configured to implement all or some operations in the embodiments performed by the foregoing SMF.

All or some of the foregoing embodiments may be implemented by using software, hardware, firmware, or any combination thereof. When the embodiments are implemented by using the software, the embodiments may be implemented completely or partially in a form of a computer program product. The computer program product includes one or more computer instructions. When the computer program instructions are loaded and executed on a computer, the procedures or functions according to the embodiments of the application are completely or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A communication method, comprising:
obtaining, by a terminal device, a reference message authentication code that is based on a first message authentication code and a second message authentication code; and
sending, by the terminal device, first information and a service request message to an access and mobility management function (AMF), wherein the first information is used to instruct the AMF to send the service request message to a session management function (SMF), the service request message comprises second information, and the second information comprises the reference message authentication code, wherein the reference message authentication code is used for the AMF to compare with the first message authentication code to check the service request message and is used for the SMF to compare with the second message authentication code to check the service request message.

2. The method according to claim 1, wherein the method further comprises:
obtaining, by the terminal device, the first message authentication code based on a first algorithm and a first input parameter, wherein the first input parameter comprises at least one of the following parameters: a first key, at least one information element in the service request message other than the reference message authentication code, or a first count value; or
obtaining, by the terminal device, the second message authentication code based on a second algorithm and a second input parameter, wherein the second input parameter comprises at least one of the following parameters: a second key, at least one information element in the service request message other than the reference message authentication code, or a second count value.

3. The method according to claim 2, wherein
in case that the first input parameter comprises the first count value, the second information further comprises a first field in the first count value; or
in case that the second input parameter comprises the second count value, the second information further comprises a second field in the second count value; or
in case that the first input parameter comprises the first count value, and the second input parameter comprises the second count value, the second information further comprises a third field, and the third field is obtained based on the first field in the first count value and the second field in the second count value; or
in case that the first input parameter comprises the first count value, the second input parameter comprises the second count value, and the first count value is the same as the second count value, the second information further comprises the first field in the first count value or the second field in the second count value; or
in case that the first input parameter comprises the first count value, the second input parameter comprises the second count value, and there is a mapping relationship between the first count value and the second count value, the second information further comprises the first field in the first count value or the second field in the second count value.

4. The method according to claim 2, wherein
in case that the first input parameter comprises the first key, the second information further comprises a first key set identifier, and the first key set identifier is used to indicate a first root key; or
in case that the second input parameter comprises the second key, the second information further comprises a second key set identifier, and the second key set identifier is used to indicate a second root key.

5. The method according to claim 2, wherein
the first input parameter further comprises some or all code segments of the second message authentication code; or
the second input parameter further comprises some or all code segments of the first message authentication code.

6. The method according to claim 1, wherein the obtaining, by the terminal device, the reference message authentication code comprises:
obtaining, by the terminal device, a third message authentication code based on the first message authentication code, the second message authentication code, and a hash algorithm, and obtaining the reference message authentication code based on the third message authentication code; or
obtaining, by the terminal device, the reference message authentication code based on the first message authentication code, the second message authentication code, and the hash algorithm.

7. The method according to claim 6, wherein in case that a length of the third message authentication code is greater than a first preset length, the reference message authentication code is some code segments of the third message authentication code, and a length of the some code segments is less than or equal to the first preset length.

8. The method according to claim 6, wherein the obtaining the reference message authentication code based on the third message authentication code comprises:
in case that a length of the third message authentication code is greater than a first preset length, obtaining the reference message authentication code based on at least two code segments of the third message authentication code.

9. The method according to claim 1, wherein the obtaining, by the terminal device, the reference message authentication code based on the first message authentication code and the second message authentication code comprises:
obtaining, by the terminal device, a first code segment based on the first message authentication code;
obtaining, by the terminal device, a second code segment based on the second message authentication code; and
splicing, by the terminal device, the first code segment and the second code segment, to obtain the reference message authentication code.

10. An apparatus, comprising a processor coupled with a non-transitory storage medium storing executable instructions; wherein the executable instructions, when executed by the processor, cause the processor to:

obtain a reference message authentication code that is based on a first message authentication code and a second message authentication code; and send first information and a service request message to an access and mobility management function (AMF), wherein the first information is used to instruct the AMF to send the service request message to a session management function (SMF), the service request message comprises second information, and the second information comprises the reference message authentication code, wherein the reference message authentication code is used for the AMF to compare with the first message authentication code to check the service request message and is used for the SMF to compare with the second message authentication code to check the service request message.

11. The apparatus according to claim 10, wherein the processor is further configured to:

obtain the first message authentication code based on a first algorithm and a first input parameter, wherein the first input parameter comprises at least one of the following parameters: a first key, at least one information element in the service request message other than the reference message authentication code, or a first count value; or obtain the second message authentication code based on a second algorithm and a second input parameter, wherein the second input parameter comprises at least one of the following parameters: a second key, at least one information element in the service request message other than the reference message authentication code, or a second count value.

12. The apparatus according to claim 11, wherein in case that the first input parameter comprises the first count value, the second information further comprises a first field in the first count value; or in case that the second input parameter comprises the second count value, the second information further comprises a second field in the second count value; or in case that the first input parameter comprises the first count value, and the second input parameter comprises the second count value, the second information further comprises a third field, and the third field is obtained based on the first field in the first count value and the second field in the second count value; or in case that the first input parameter comprises the first count value, the second input parameter comprises the second count value, and the first count value is the same as the second count value, the second information further comprises the first field in the first count value or the second field in the second count value; or in case that the first input parameter comprises the first count value, the second input parameter comprises the second count value, and there is a mapping relationship between the first count value and the second count value, the second information further comprises the first field in the first count value or the second field in the second count value.

13. The apparatus according to claim 11, wherein in case that the first input parameter comprises the first key, the second information further comprises a first key set identifier, and the first key set identifier is used to indicate a first root key; or in case that the second input parameter comprises the second key, the second information further comprises a second key set identifier, and the second key set identifier is used to indicate a second root key.

14. The apparatus according to claim 11, wherein the first input parameter further comprises some or all code segments of the second message authentication code; or the second input parameter further comprises some or all code segments of the first message authentication code.

15. The apparatus according to claim 10, wherein the processor is further configured to:

obtain a third message authentication code based on the first message authentication code, the second message authentication code, and a hash algorithm, and obtaining the reference message authentication code based on the third message authentication code; or obtain the reference message authentication code based on the first message authentication code, the second message authentication code, and the hash algorithm.

16. The apparatus according to claim 10, wherein the processor is further configured to:

obtain a first code segment based on the first message authentication code;

obtain a second code segment based on the second message authentication code; and splice the first code segment and the second code segment to obtain the reference message authentication code.

17. A non-transitory computer readable medium comprising computer program codes stored thereon, executable by one or more digital processors for providing system configurations, the computer program codes comprising:

instructions for obtaining a reference message authentication code that is based on a first message authentication code and a second message authentication code; and instructions for sending first information and a service request message to an access and mobility management function (AMF), wherein the first information is used to instruct the AMF to send the service request message to a session management function (SMF), the service request message comprises second information, and the second information comprises the reference message authentication code, wherein the reference message authentication code is used for the AMF to compare with the first message authentication code to check the service request message and is used for the SMF to compare with the second message authentication code to check the service request message.

18. The non-transitory computer readable medium according to claim 17, wherein the computer program codes further comprises:

instructions for obtaining the first message authentication code based on a first algorithm and a first input parameter, wherein the first input parameter comprises at least one of the following parameters: a first key, at least one information element in the service request message other than the reference message authentication code, or a first count value; or instructions for obtaining the second message authentication code based on a second algorithm and a second input parameter, wherein the second input parameter comprises at least one of the following parameters: a second key, at least one information element in the service request message other than the reference message authentication code, or a second count value.

19. The non-transitory computer readable medium according to claim 18, wherein in case that the first input parameter comprises the first count value, the second information further comprises a first field in the first count value; or in case that the second input parameter comprises the second count value, the second information further comprises a second field in the second count value; or in case that the first input parameter comprises the first count value, and the second input parameter comprises the second count value, the second information further comprises a third field, and the third field is obtained based on the first field in the first count value and the second field in the second count value; or in case that the first input parameter comprises the first count value, the second input parameter comprises the second count value, and the first count value is the same as the second count value, the second information further comprises the first field in the first count value or the second field in the second count value; or in case that the first input parameter comprises the first count value, the second input parameter comprises the second count value, and there is a mapping relationship between the first count value and the second count value, the second information further comprises the first field in the first count value or the second field in the second count value.

20. The non-transitory computer readable medium according to claim 18, wherein in case that the first input parameter comprises the first key, the second information further comprises a first key set identifier, and the first key set identifier is used to indicate a first root key; or in case that the second input parameter comprises the second key, the second information further comprises a second key set identifier, and the second key set identifier is used to indicate a second root key.

* * * * *